(12) United States Patent
Bailey et al.

(10) Patent No.: US 8,200,518 B2
(45) Date of Patent: Jun. 12, 2012

(54) COMPUTER-IMPLEMENTED SYSTEMS AND METHODS FOR PARTIAL CONTRIBUTION COMPUTATION IN ABC/M MODELS

(75) Inventors: Christopher D. Bailey, Cary, NC (US); Dmitry V. Golovashkin, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1074 days.

(21) Appl. No.: 12/036,407

(22) Filed: Feb. 25, 2008

(65) Prior Publication Data

US 2009/0216580 A1 Aug. 27, 2009

(51) Int. Cl.
*G06Q 10/00* (2012.01)
(52) U.S. Cl. ...................................................... 705/7.11
(58) Field of Classification Search .............. 705/7, 7.11
See application file for complete search history.

(56) References Cited

U.S. PATENT DOCUMENTS

| | | | |
|---|---|---|---|
| 5,627,973 A | 5/1997 | Armstrong et al. | |
| 5,652,842 A | 7/1997 | Siegrist et al. | |
| 5,790,847 A | 8/1998 | Fisk et al. | |
| 5,799,286 A | 8/1998 | Morgan et al. | |
| 5,963,910 A | 10/1999 | Ulwick | |
| 5,970,476 A | 10/1999 | Fahey | |
| 6,009,407 A | 12/1999 | Garg | |
| 6,014,640 A * | 1/2000 | Bent ............................... | 705/30 |
| 6,029,139 A | 2/2000 | Cunningham et al. | |
| 6,032,123 A | 2/2000 | Jameson | |
| 6,078,892 A | 6/2000 | Anderson et al. | |
| 6,115,691 A | 9/2000 | Ulwick | |
| 6,236,977 B1 | 5/2001 | Verba et al. | |
| 6,237,138 B1 | 5/2001 | Hameluck et al. | |
| 6,275,812 B1 | 8/2001 | Haq et al. | |
| 6,286,005 B1 | 9/2001 | Cannon | |
| 6,321,206 B1 | 11/2001 | Honarvar | |
| 6,330,552 B1 | 12/2001 | Farrar et al. | |
| 6,490,569 B1 * | 12/2002 | Grune et al. ................... | 705/400 |
| 6,502,077 B1 | 12/2002 | Speicher | |
| 6,526,526 B1 | 2/2003 | Dong et al. | |
| 6,584,447 B1 | 6/2003 | Fox et al. | |
| 6,611,829 B1 | 8/2003 | Tate et al. | |

(Continued)

FOREIGN PATENT DOCUMENTS

WO 0111522 2/2001

OTHER PUBLICATIONS

Horngren, Charles T, et al.,. "Cost Accounting a Managerial Emphasis", Tenth Edition, Chapter 14, pp. 497-534, 2000.*

(Continued)

*Primary Examiner* — Jonathan G Sterrett
*Assistant Examiner* — Stephanie Delich
(74) *Attorney, Agent, or Firm* — Jones Day

(57) ABSTRACT

Computer-implemented systems and methods for analyzing costs associated with a cost flow model having components of relationships and entities. A system and method can be configured to receive a data associated with the cost flow model as well as source-entity definitions, via-entity sets, and target-entity definitions. A set of linear equations is created that is representative of the costs and entity relationships, wherein data about certain relationships satisfying a removal criteria are not included in the matrices. The system of linear equations is solved to determine contribution values from the source entities to the target entities through the via-sets.

13 Claims, 16 Drawing Sheets

U.S. PATENT DOCUMENTS

| | | | |
|---|---|---|---|
| 6,640,215 | B1 | 10/2003 | Galperin et al. |
| 6,735,570 | B1 | 5/2004 | Lacy et al. |
| 6,901,406 | B2 | 5/2005 | Nabe et al. |
| 6,907,382 | B2 | 6/2005 | Urokohara |
| 6,965,867 | B1 | 11/2005 | Jameson |
| 6,970,830 | B1 | 11/2005 | Samra et al. |
| 7,003,470 | B1 | 2/2006 | Baker et al. |
| 7,177,850 | B2 | 2/2007 | Argenton et al. |
| 7,240,019 | B2 | 7/2007 | Delurgio et al. |
| 7,249,033 | B1 | 7/2007 | Close et al. |
| 7,308,414 | B2 | 12/2007 | Parker et al. |
| 7,376,647 | B1 | 5/2008 | Guyan et al. |
| 7,412,413 | B2 * | 8/2008 | James ............................ 705/35 |
| 7,565,300 | B2 | 7/2009 | Hunt et al. |
| 7,617,119 | B1 | 11/2009 | Neal et al. |
| 7,634,431 | B2 | 12/2009 | Stratton |
| 7,813,948 | B2 | 10/2010 | Ratzloff |
| 2001/0014868 | A1 | 8/2001 | Herz et al. |
| 2001/0047274 | A1 * | 11/2001 | Borton ............................ 705/1 |
| 2002/0013757 | A1 | 1/2002 | Bykowsky et al. |
| 2002/0016752 | A1 | 2/2002 | Suh |
| 2002/0046078 | A1 | 4/2002 | Mundell et al. |
| 2002/0046096 | A1 | 4/2002 | Srinivasan et al. |
| 2002/0072953 | A1 | 6/2002 | Michlowitz et al. |
| 2002/0091909 | A1 | 7/2002 | Nakanishi |
| 2002/0107723 | A1 | 8/2002 | Benjamin et al. |
| 2002/0109715 | A1 | 8/2002 | Janson |
| 2002/0116237 | A1 | 8/2002 | Cohen et al. |
| 2002/0123930 | A1 | 9/2002 | Boyd et al. |
| 2002/0123945 | A1 | 9/2002 | Booth et al. |
| 2002/0147668 | A1 | 10/2002 | Smith et al. |
| 2002/0169654 | A1 | 11/2002 | Santos et al. |
| 2002/0169655 | A1 | 11/2002 | Beyer et al. |
| 2002/0178049 | A1 | 11/2002 | Bye |
| 2003/0018503 | A1 | 1/2003 | Shulman |
| 2003/0023598 | A1 | 1/2003 | Janakiraman et al. |
| 2003/0041069 | A1 * | 2/2003 | Yorke ....................... 707/103 R |
| 2003/0078830 | A1 | 4/2003 | Wagner et al. |
| 2003/0083924 | A1 | 5/2003 | Lee et al. |
| 2003/0083925 | A1 | 5/2003 | Weaver et al. |
| 2003/0088458 | A1 | 5/2003 | Afeyan et al. |
| 2003/0097292 | A1 | 5/2003 | Chen et al. |
| 2003/0110072 | A1 | 6/2003 | Delurgio et al. |
| 2003/0110080 | A1 | 6/2003 | Tsutani et al. |
| 2003/0120584 | A1 | 6/2003 | Zarefoss et al. |
| 2003/0120651 | A1 | 6/2003 | Bernstein et al. |
| 2003/0126010 | A1 | 7/2003 | Barns-Slavin |
| 2003/0149613 | A1 | 8/2003 | Cohen et al. |
| 2003/0182387 | A1 | 9/2003 | Geshwind |
| 2003/0208402 | A1 | 11/2003 | Bibelnieks et al. |
| 2003/0208420 | A1 | 11/2003 | Kansal |
| 2003/0220906 | A1 | 11/2003 | Chickering |
| 2003/0225660 | A1 | 12/2003 | Noser et al. |
| 2003/0236721 | A1 | 12/2003 | Plumer et al. |
| 2004/0073496 | A1 | 4/2004 | Cohen |
| 2004/0162743 | A1 * | 8/2004 | Thier ............................... 705/7 |
| 2005/0131802 | A1 | 6/2005 | Glodjo |
| 2005/0171918 | A1 | 8/2005 | Eden et al. |
| 2005/0187917 | A1 | 8/2005 | Lawande et al. |
| 2005/0192876 | A1 | 9/2005 | McKee, Jr. |
| 2005/0228800 | A1 * | 10/2005 | Dettinger et al. ............. 707/100 |
| 2006/0136098 | A1 | 6/2006 | Chitrapura et al. |
| 2006/0143042 | A1 | 6/2006 | Gragg et al. |
| 2006/0161637 | A1 | 7/2006 | Friess et al. |
| 2006/0253403 | A1 | 11/2006 | Stacklin et al. |
| 2007/0050282 | A1 | 3/2007 | Chen et al. |
| 2007/0226090 | A1 * | 9/2007 | Stratton ......................... 705/30 |
| 2008/0065435 | A1 * | 3/2008 | Ratzloff ............................ 705/7 |
| 2009/0018880 | A1 * | 1/2009 | Bailey et al. ..................... 705/7 |

OTHER PUBLICATIONS

Balintfy, Joseph L. et al., "Binary and Chain Comparisons with an Experimental Linear Programming Food Price Index", The Review of Economics and Statistics, vol. 52, No. 3, pp. 324-330 [JSTOR] (Aug. 1970).

Beamon, Benita M., "Supply chain design and analysis: Models and methods", International Journal of Production Economics, pp. 281-294 (Apr. 15, 1998).

Cohen, Marc-david et al., "SAS/OR® Optimization Procedures, with Applications to the Oil Industry," SUGI Proceedings, pp. 1-9 (1994).

Cokins, Gary et al., "An ABC Manager's Primer Straight Talk on Activity-Based Costing", Institute of Management Accountants, pp. 1-40, 63-64 (Mar. 9, 1993).

Cook, Wade D. et al., "Evaluating Suppliers of Complex Systems: A Multiple Criteria Approach", The Journal of the Operational Research Society, vol. 43, No. 11, pp. 1055-1061 (Nov. 1992).

Gilbert, John R. et al., "Sparse Matrices in Matlab: Design and Implementation", SIAM Journal on Matrix Analysis and Applications, pp. 1-24 (1991).

Hollander, Geoffrey, "Model1 deftly parses customer characteristics", InfoWorld, vol. 20, No. 21, pp. 1-4, retrieved from: Dialog, file 148 (May 25, 1998).

Horngren, Charles T. et al., "Cost Accounting A Managerial Emphasis", Tenth Edition, Chapter 14, pp. 497-534 (2000).

Johnson, Ellis L. et al., "Recent Developments and Future Directions in Mathematical Programming", IBM Systems Journal, vol. 31, No. 1, pp. 79-93 [DIALOG: file 15] (1992).

Kearney, Trevor D., "Advances in Mathematical Programming and Optimization in the SAS System," SUGI Proceedings, 12 pp. (1999).

Lee, Eon-Kyung et al., "An effective supplier development methodology for enhancing supply chain performance," ICMIT 2000, pp. 815-820 (2000).

Lee, Eon-Kyung et al., "Supplier Selection and Management System Considering Relationships in Supply Chain Management", IEEE Transactions on Engineering Management, vol. 48, No. 3, pp. 307-318 (Aug. 2001).

Manchanda, Puneet et al., "The 'Shopping Basket': A Model for Multi-category Purchase Incidence Decisions", Marketing Science, vol. 18, No. 2, pp. 95-114 [JSTOR] (1999).

Medaglia, Andres L., "Simulation Optimization Using Soft Computing", dissertation for Operations Research Department at North Carolina State University, 2 pp. (Jan. 24, 2001).

Porter-Kuchay, Suzanne, "Multidimensional Marketing", Target Marketing, [DIALOG: file 13] (Jan. 2000).

Rosen, Michele, "There's Gold in That There Data", Insurance & Technology, vol. 23, No. 12, pp. 1-6, retrieved from: Dialog, file 16 (Dec. 1998).

Saarenvirta, Gary, "Data Mining to Improve Profitability", CMA Magazine, vol. 72, No. 2, pp. 8-12 [DIALOG: file 15] (Mar. 1998).

Samudhram, Ananda, "Solver setting for optimal solutions", New Strait Times, 3 pp. (Nov. 22, 1999).

Spiegelman, Lisa L., "Optimizers Assist in Specialized Marketing Efforts", Computer Reseller News, [PROQUEST] (Nov. 22, 1999).

Data Mining News, Looking Past Automation, MarketSwitch Focuses on Optimization of Marketing Campaigns, Data Mining News, [GOOGLE] (May 10, 1999).

Model1 by Group 1 Software, www.g1.com, [retrieved Dec. 21, 2005], pp. 1-16, retrieved from: Google.com and archive.org (Aug. 29, 1999).

SAS Institute Inc., Data Mining, www.sas.com, [retrieved Dec. 22, 2005], pp. 1-28, retrieved from: Google.com and archive.org (Jan. 29, 1998).

"i2 Technologies: i2 releases i2 Five.Two—The complete platform for dynamic value chain management; Flexible, intuitive, powerful solutions designed to help companies gain efficiencies and drive revenue", M2 Presswire, 4 pp. (Oct. 25, 2001).

"Perfect and Open Ratings Form Alliance to Provide Critical Supplier Performance Ratings to Private Exchanges and Net Markets", Business Wire, 3 pp. (Oct. 30, 2000).

"Unica Releases Model 1 Enterprise Edition", Business Wire, [retrieved Dec. 22, 2005, pp. 1-3, retrieved from: Proquest Direct (Oct. 29, 1998).

* cited by examiner

COMPUTER-IMPLEMENTED SYSTEMS AND METHODS FOR PARTIAL CONTRIBUTION COMPUTATION IN ABC/M MODELS

CROSS-REFERENCE TO RELATED APPLICATIONS

This application contains subject matter that may be considered related to subject matter disclosed in U.S. patent application Ser. No. 11/510,527 (entitled Computer-implemented systems and methods for reducing cost flow models" and filed on Aug. 25, 2006) and to U.S. patent application Ser. No. 11/370,371 (entitled "Systems and methods for costing reciprocal relationships" and filed on Mar. 8, 2006) and to U.S. patent application Ser. No. 11/777,686 (entitled "Computer-implemented systems and methods for cost flow analysis" and filed on Jul. 13, 2007), of which the entire disclosures (including any and all figures) of these applications are incorporated herein by reference.

TECHNICAL FIELD

This document relates generally to computer-implemented cost analysis and more particularly to computer-implemented cost analysis of reciprocal business relationships.

BACKGROUND

The purpose of activity based costing and management (ABC/M) is to link company processes, activities, and products with company costs and performance. More specifically, ABC/M provides quantitative answers to how much money or resources were consumed by specific activities, and how these activities translate to specific cost objects or products. Among ABC/M benefits is the ability to trace and assign costs based on cause and effect relationships. ABC/M methodology gives accurate cost values, helps explain which processes/activities drive the cost levels, and provides analytical insight into current and future operations.

A cost flow model, such as an ABC/M model, is a multi-dimensional directed graph. It depicts how money flows in an enterprise. The nodes in the graph represent the resource, activity, or cost object accounts. The edges in the graph typically have a percentage on them, which defines how much money flows from a source account to a destination account.

For example, in a company money may flow through many paths, and the linkage between origin and destination can therefore become murky. Activity-based costing and management systems show the flow, and can compute multi-stage partial contributions. However, traditional methods for determining the cost of reciprocal relationships (e.g., a step down method, a simultaneous equations method, etc.) do not represent the reality of the business situation and can result in cost calculations that appear abnormally large due to the effects of self-contributions and double-counting.

SUMMARY

In accordance with the teachings provided herein, computer-implemented systems and methods for operation upon data processing devices are provided for analyzing costs associated with a cost flow model having components of relationships and entities. As an illustration, a system and method can be configured to receive data associated with the cost flow model that identifies the costs associated with the relationships among the entities. Additionally, a set of source-entity definitions and a set of target-entity definitions are received which define what entities in the cost flow model contribute money and receive money, respectively. A system of linear equations is generated based upon the received data, wherein data about certain relationships which satisfy a removal criteria are not included in the system of equations. The system of linear equations is solved to determine contribution values from the source entities to the target entities, and the determined values are provided to a user or an external system.

As another illustration, a system and method can be configured to further receive a via-entity set definitions that define sets of intermediate entities in the cost flow model through which the source entities provide money to other entities in the cost flow model. A contribution problem is then solved for each intermediate entity, wherein the final contribution problem solved is based upon sum of flows on the target entities following solving of the contribution problem for each via-entity set.

DETAILED DESCRIPTION

Figure 1:
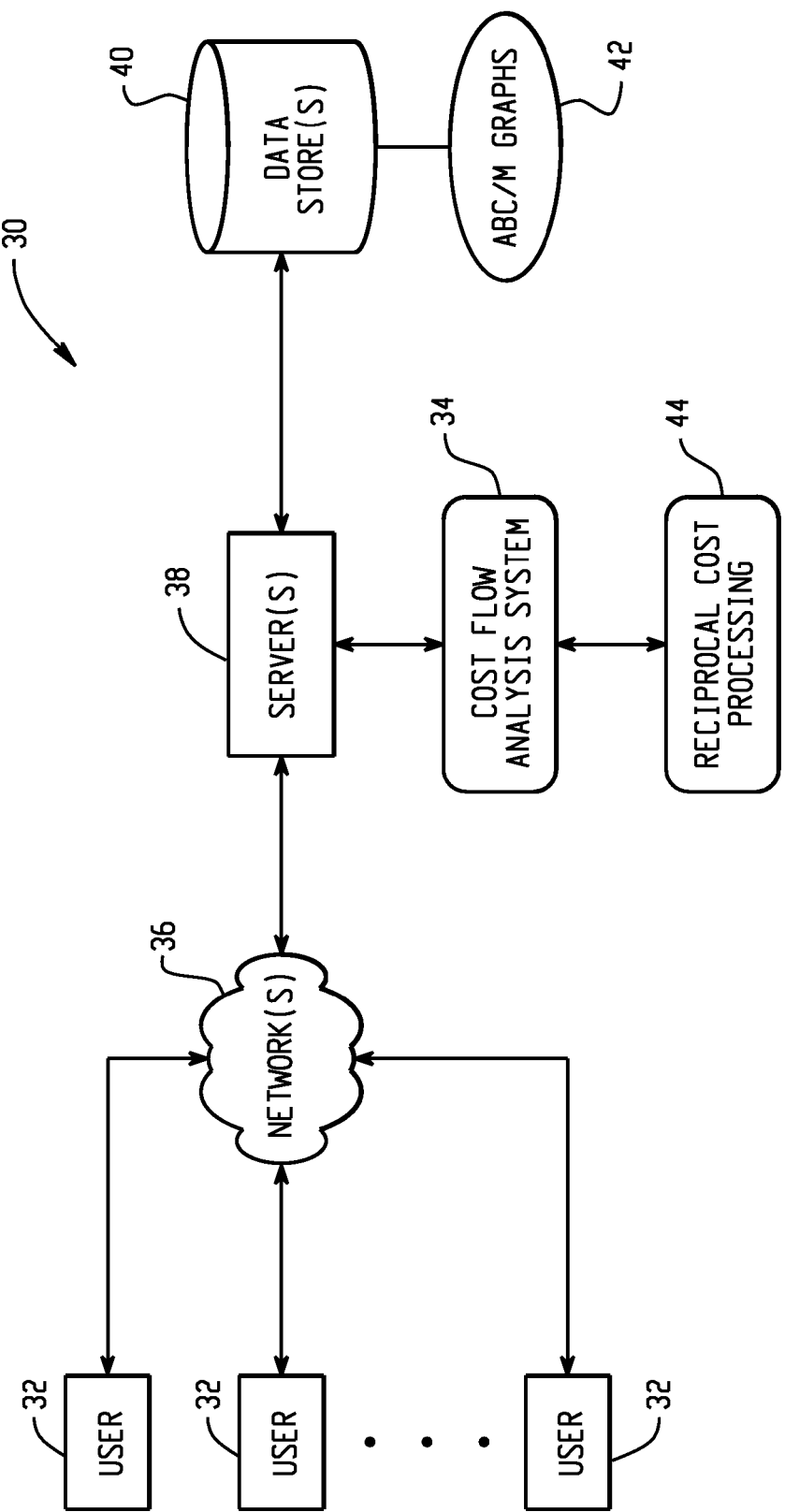
FIG. 1 is a block diagram depicting a computer-implemented environment wherein users can interact with a cost flow analysis system.

FIG. 1 depicts at 30 a computer-implemented environment wherein users 32 can interact with a cost flow analysis system 34 hosted on one or more servers 38. The system 34 accesses software operations or routines 44 in order to solve a partial contribution computation. These partial contribution computations answer a given question, such as how much money flows from a specified set of source-nodes to a specified set of target-nodes. It should be noted that while ABC/M calculations are normally concerned with the flow of money, these procedures could be equally well adapted to consider the movement of other resources such as raw materials or labor which are fully within the spirit of this disclosure.

To facilitate the providing to and receiving of information from the cost flow analysis system 34, the users 32 can interact with the system 34 through a number of ways, such as over one or more networks 36. One or more servers 38 accessible through the network(s) 36 can host the cost flow analysis system 34. It should be understood that the cost flow analysis system 34 could also be provided on a stand-alone computer for access by a user.

The cost flow analysis system 34 can be an integrated web-based reporting and analysis tool that provides users flexibility and functionality for performing cost flow determinations and analysis. One or more data stores 40 can store the data to be analyzed by the system 34 as well as any intermediate or final data generated by the system 34. For example, data store(s) 40 can store the data representation of cost flow graph(s) 42, such as the data associated with the cost flow model that identifies the costs associated with the relationships among the entities as well as one or more matrices that are representative of the costs and the entity relationships. Examples of data store(s) 40 can include relational database management systems (RDBMS), a multi-dimensional database (MDDB), such as an Online Analytical Processing (OLAP) database, etc.

Figure 2:
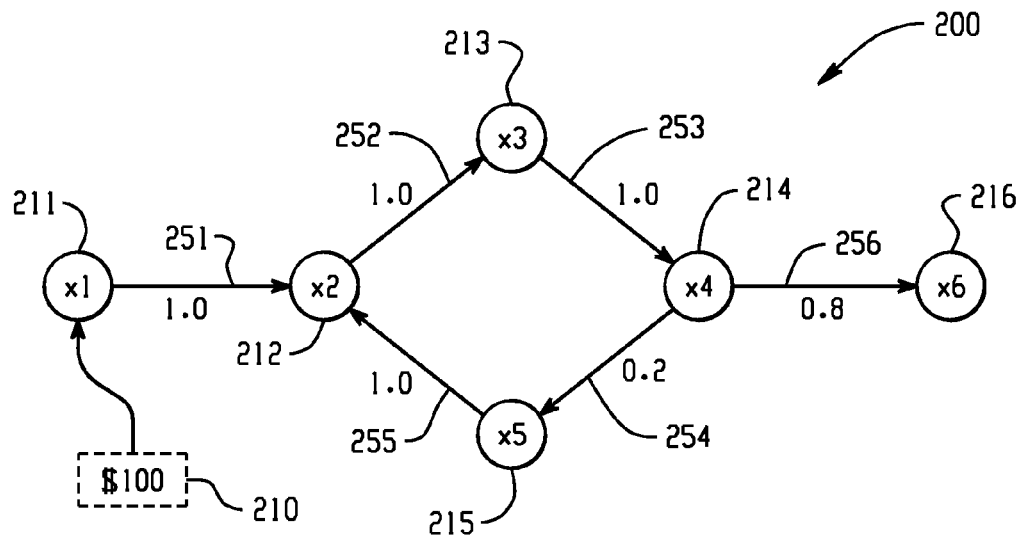
FIG. 2 depicts an example of a cyclic model.

FIG. 2 depicts at 200 an ABC/M model for use in describing terminology associated with the systems and methods described herein. The ABC/M model 200 can be stated as a directed graph G(N,E), whose nodes N 210-216 correspond to resources, activities, and cost objects (e.g., ABC/M model entities). The graph's edges E 251-256 capture the flow of money. The nodes N and edges E and their interrelationships as depicted on the graph G, are used for solving a diverse number of problems, such as how to compute money contribution from an arbitrary set of source-nodes $F(F \subset N)$ into an arbitrary set of target-nodes $T(T \subset N)$. An ABC/M system computes a single value Contrib(F,T) which captures the total amount of money transferred (e.g., contributed) from the set of source-nodes to the set of target-nodes.

Another approach for using a directed graph to solve a given problem includes identifying a number of nodes through which money flows from the source-nodes to the target-nodes. These intermediary type nodes can be termed "via-sets." When via-sets are defined, the calculation of money flow from source-nodes $F(F \subset N)$ to target-nodes $T(T \subset N)$ traverse the specified via-sets $\{V_1, V_2, \ldots, V_k\}$ where $k(\geq 0)$. Thus, the problem of seeking the contribution from an arbitrary set of source-nodes to an arbitrary set of target nodes through an arbitrary number of via-sets can be represented as Contrib(F, $V_1, \ldots, V_k$, T). The original problem omitting via-sets can be viewed as a special case of the more general via-set contribution, specifically where the number of required via-sets is equal to zero.

Figure 3:
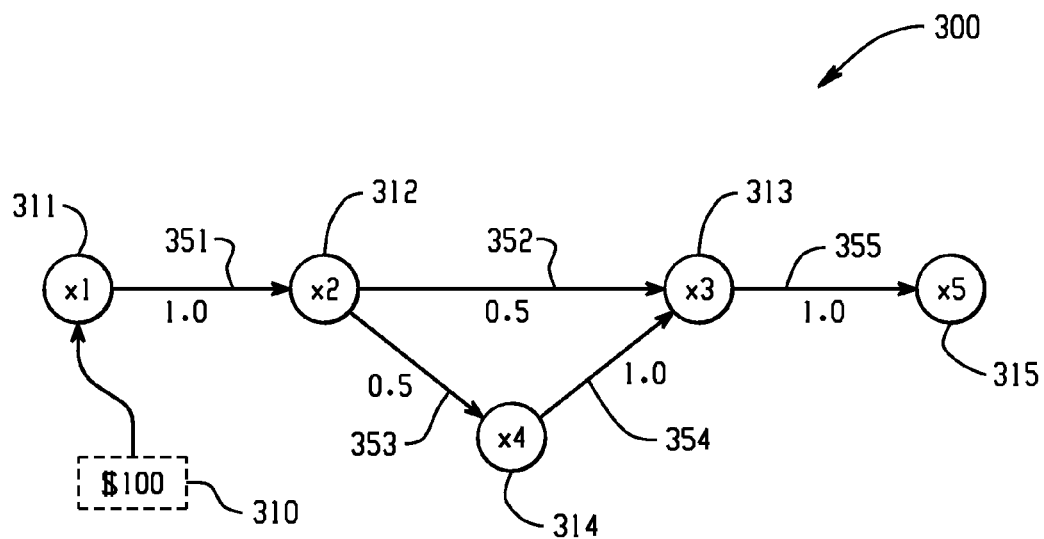
FIG. 3 depicts an example of an acyclic model.

The systems and methods disclosed herein can process many different types of graphs that contain source-nodes and target-nodes, such as the different types of graphs depicted in FIGS. 2 and 3. FIG. 2 depicts an example of a cyclic ABC/M model 200. The model depicted in this figure is considered cyclic because a path from the output edges of at least one of the nodes of the graph can be traced through other nodes back to itself. For example, in FIG. 2, node x2 212 possesses one output edge 252. This output edge transfers 100% of node x2's 212 money to node x3 213. Node x3 213 further transfers 100% of its money to node x4 214 through edge 253. Node x4 214 transfers 80% of its money to node x6 216 through edge 256. Node x4 214 further transfers 20% of its money to node x5 215 through edge 254. Node x5 215, in turn, transfers 100% of its received resources to node x2 212 through edge 255. Because the outputs of node x2 212 can be traced through the other nodes and return in part as an input to node x2 212 (x2→3→x4→x5→x2), the graph of FIG. 2 is considered cyclic in nature.

This is in contrast to the acyclic ABC/M model 300 depicted in FIG. 3. Note that in this model 300, no node output can be traced back as an input to that node. For example, it is not possible to trace the output of node x2 312 through edges 352 or 353 and any other nodes back to node x2 312 as an input. Thus, the ABC/M model 300 is considered acyclic.

With reference back to FIG. 2, node x1 211 is initially seeded with $100. Knowing this, the ABC/M graph 200 of FIG. 2 can be represented using the following system of linear equations:

$$\begin{bmatrix} 1 & 0 & 0 & 0 & 0 & 0 \\ -1 & 1 & 0 & 0 & -1 & 0 \\ 0 & -1 & 1 & 0 & 0 & 0 \\ 0 & 0 & -1 & 1 & 0 & 0 \\ 0 & 0 & 0 & -0.2 & 1 & 0 \\ 0 & 0 & 0 & -0.8 & 0 & 1 \end{bmatrix} \begin{bmatrix} x1 \\ x2 \\ x3 \\ x4 \\ x5 \\ x6 \end{bmatrix} = \begin{bmatrix} 100 \\ 0 \\ 0 \\ 0 \\ 0 \\ 0 \end{bmatrix}$$

The solution corresponding to these equations is as follows:

x1=100, x2=125, x3=125, x4=125, x5=25, x6=100

A user may wish to determine x1's 211 contribution to x2 212. It would be illogical to report the total flow of $125 corresponding to x2 calculated above because this number exceeds the input money. The inflated value is explained by the self-contribution phenomenon. The total cumulative flow through node x2 212 is increased because of the cycle, x2→x3→x4→5→x2. Note that the output of the system is still only $100 as noted by the flow on node x6 216. Generally speaking, if there are cycles in an ABC/M graph, intermediate flows can be arbitrarily large. Therefore, these cumulative flow values are of little value.

The acyclic model of FIG. 3 300 is again referenced to illustrate another example of a question a user may wish to ask. In this example, the question of interest is to compute the contribution from node x1 311 to nodes x2 312 and x3 313 when $100 is initially supplied to node x1 311. Note that the target, T{x2, x3}, is a set of nodes. Thus, the answer to the question is a single value which captures the contribution into this set. The following system of linear equations corresponds to the acyclic model depicted in FIG. 3:

$$\begin{bmatrix} 1 & 0 & 0 & 0 & 0 \\ -1 & 1 & 0 & 0 & 0 \\ 0 & -0.5 & 1 & -1 & 0 \\ 0 & -0.5 & 0 & 1 & 0 \\ 0 & 0 & -1 & 0 & 1 \end{bmatrix} \begin{bmatrix} x1 \\ x2 \\ x3 \\ x4 \\ x5 \end{bmatrix} = \begin{bmatrix} 100 \\ 0 \\ 0 \\ 0 \\ 0 \end{bmatrix}$$

The solution vector is as follows:

x1=100, x2=100, x3=100, x4=50, x5=100

The combining of the flows on nodes x2 312 and x3 313 fails to offer a satisfactory answer because the sum of the flows on these nodes, $200, is greater than the total contribution of money into the system, $100, due to double-counting of money similar to that seen in the previous example of FIG. 2.

Figure 5:
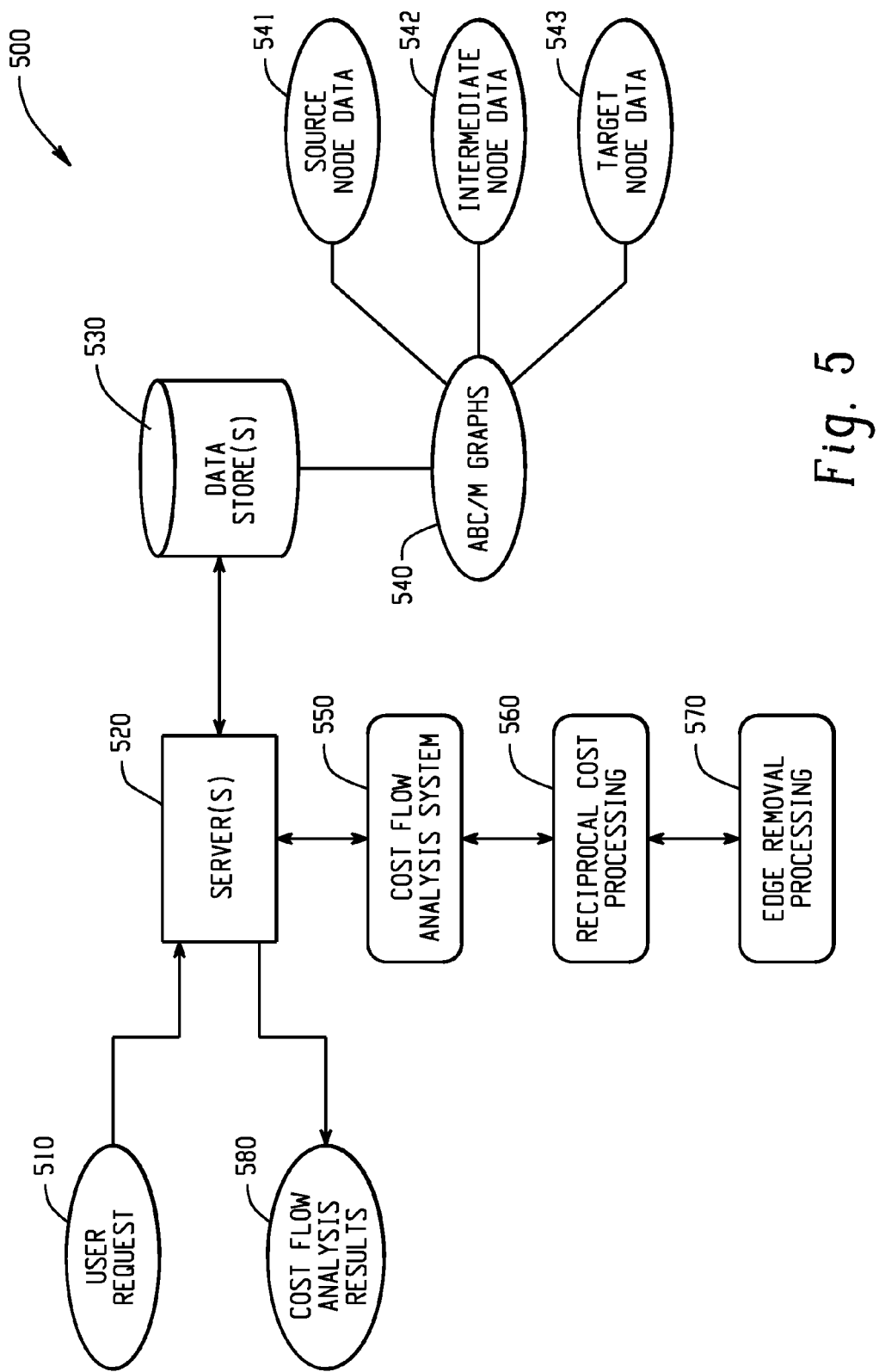
FIG. 5 is a block diagram depicting a computer-implemented environment wherein cost flows can be calculated in an ABC/M model including partial contribution computations.

FIG. 5 is a block diagram 500 depicting a computer-implemented environment wherein cost flows can be calculated in an ABC/M model which involve partial contribution computations. The approach of FIG. 5 addresses difficulties illustrated in the prior examples of FIGS. 2 and 3 (e.g., cyclic self-contribution and contribution between two or more target nodes) and provides a process for computation of partial contribution problem, Contrib(F, $V_1, \ldots, V_k$, T), which offers meaningful results.

With reference to FIG. 5, a user makes a partial contribution computation request 510 to server 520. The user request may specify the details of the model to be analyzed, or may direct the server to a data store 530 containing model graph definitions. The ABC/M graph 540 is combined with source-node data 541, intermediate (via) node data 542, and target-node data 543 to form the parameters of the analysis to be done. This data is then passed to a cost flow analysis system 550. The cost flow analysis system 550 handles reciprocal cost processing 560 such as in the following manner. Reciprocal cost processing 560 uses process 570 to remove all out-edges for all target-node set members. The resultant system of simultaneous linear equations is then solved. The solution components corresponding to the target node flows are then summed to calculate the total flow to the target-node set and the cost flow analysis results 580 are returned to the user by the server 520.

Figure 4:
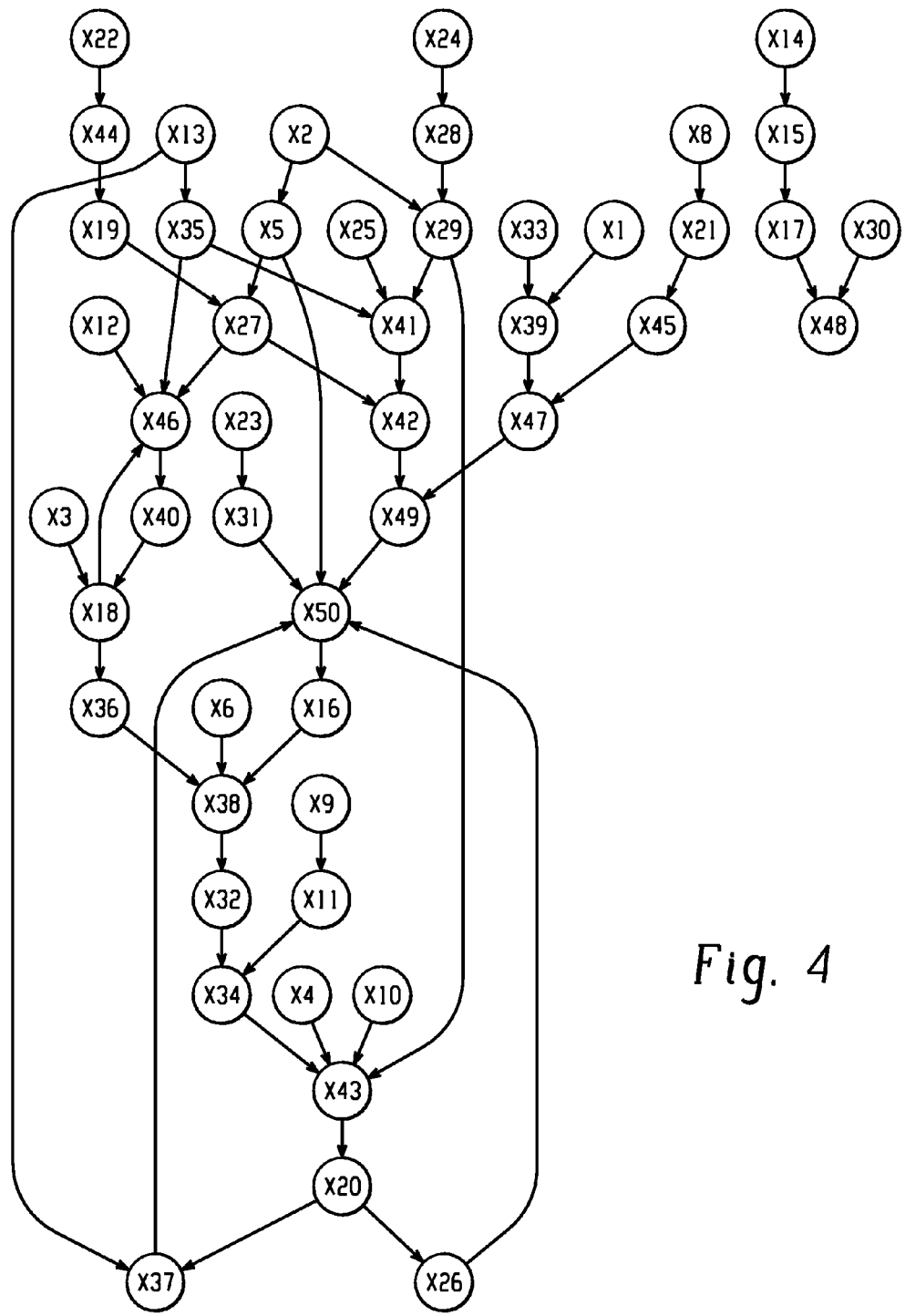
FIG. 4 illustrates the complexity that a cost flow graph can assume.

By removing all out-edges for all target nodes, this approach excludes both double-counting possibilities described above, and the money contributed to the target-node set is accounted for only once. Additionally, this approach is advantageous because it no longer matters whether the initial ABC/M graph is cyclic or acyclic. This approach will result in a meaningful result regardless of the original graph structure resulting in the ability to uniformly calculate partial contribution questions without special consideration of special case cyclic graphs. This simplification may be beneficial in situations involving complicated graphs such as that depicted in FIG. 4 where the determination of cycles and their effect on calculations becomes very difficult due to the very large size of the ABC/M model.

Figure 6:
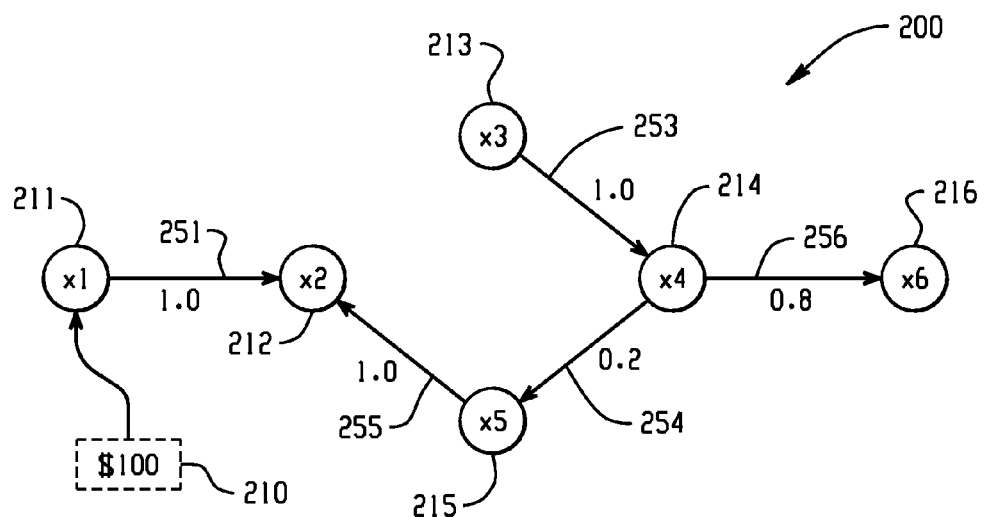
FIG. 6 depicts an example of a modified cyclic model.

FIG. 6 depicts a modified cyclic model 200 for use in illustrating the partial contribution computation approach depicted in FIG. 5. As was the case in the example of FIG. 2, the question of interest is the amount of the contribution from source-node x1 211 to target-node x2 212. Note that in accordance with the approach described in FIG. 5, target-node x2's 212 out-edge 252 has been removed from the model graph. The graph of FIG. 6 can then be represented as:

$$\begin{bmatrix} 1 & 0 & 0 & 0 & 0 & 0 \\ -1 & 1 & 0 & 0 & -1 & 0 \\ 0 & -1 & 1 & 0 & 0 & 0 \\ 0 & 0 & -1 & 1 & 0 & 0 \\ 0 & 0 & 0 & -0.2 & 1 & 0 \\ 0 & 0 & 0 & -0.8 & 0 & 1 \end{bmatrix} \begin{bmatrix} x1 \\ x2 \\ x3 \\ x4 \\ x5 \\ x6 \end{bmatrix} = \begin{bmatrix} 100 \\ 0 \\ 0 \\ 0 \\ 0 \\ 0 \end{bmatrix}$$

Note the zero in row 3, column 2 which corresponds to removed edge 252. Solving this equation results in the solution vector as follows:

x1=100, x2=100, x3=0, x4=0, x5=0, x6=0

Summing the flows on the target-node set members {x2=$100} gives the answer to the question of the contribution of source-node x1 211 to target node x2 212.

Figure 7:
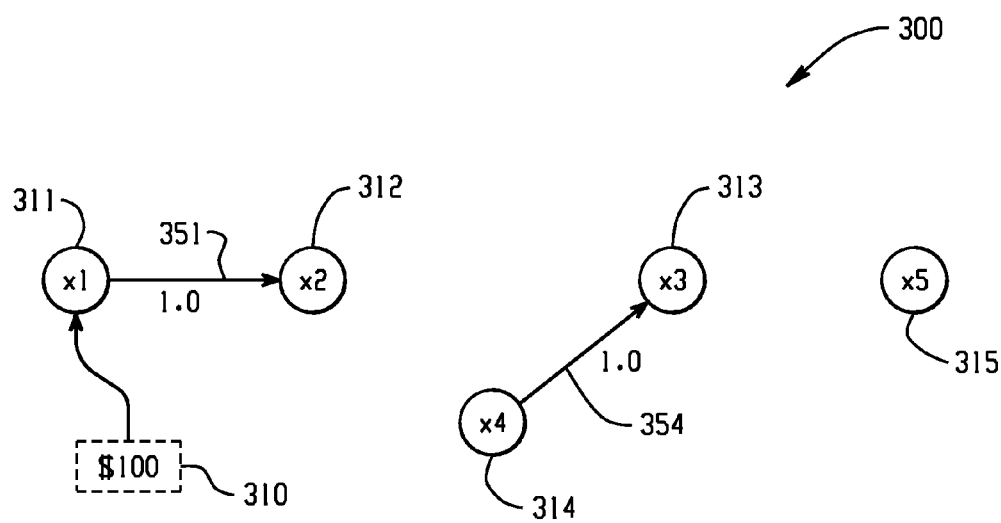
FIG. 7 depicts an example of a modified acyclic model.

FIG. 7 depicts an acyclic model 300 that has been modified for application of the partial contribution procedure. As was the case in the prior example for FIG. 3, the question of interest is to compute the contribution from source-node x1 311 to target-nodes x2 312 and x3 313 when $100 is initially supplied to node x1 311. In this example, all out-edges from the target-nodes are removed. Thus, edges 352 and 353 are removed as outputs from node x2 312 and edge 355 is removed from node x3 313. This graph can then be represented as the following set of linear equations:

$$\begin{bmatrix} 1 & 0 & 0 & 0 & 0 \\ -1 & 1 & 0 & 0 & 0 \\ 0 & 0 & 1 & -1 & 0 \\ 0 & 0 & 0 & 1 & 0 \\ 0 & 0 & 0 & 0 & 1 \end{bmatrix} \begin{bmatrix} x1 \\ x2 \\ x3 \\ x4 \\ x5 \end{bmatrix} = \begin{bmatrix} 100 \\ 0 \\ 0 \\ 0 \\ 0 \end{bmatrix}$$

Note the zeros in row 3 column 2, row 4 column 2, and row 5 column 3 corresponding to removed out-edges 352, 353, and 355, respectively. Solving these equations results in the following solution vector:

x1=100, x2=100, x3=0, x4=0, x5=0

Summing the values corresponding to the target-node flows {x2, x3} gives the desired result for the contribution from source-node x1 311 to target-nodes x2 312 and x3 313 of $100.

The approaches and examples discussed in reference to FIGS. 5 and 6 illustrate the ability of the disclosed method to accurately represent contributions from arbitrary source-nodes to arbitrary target-nodes even in situations where cycles are present within the model graph. The following is discussion of another partial contribution computation wherein a set of required via-nodes is identified in the question being asked. (Recall that the examples of FIG. 6 and FIG. 7 are special cases of this paradigm where the number of required via-sets is equal to zero.)

Figure 8:
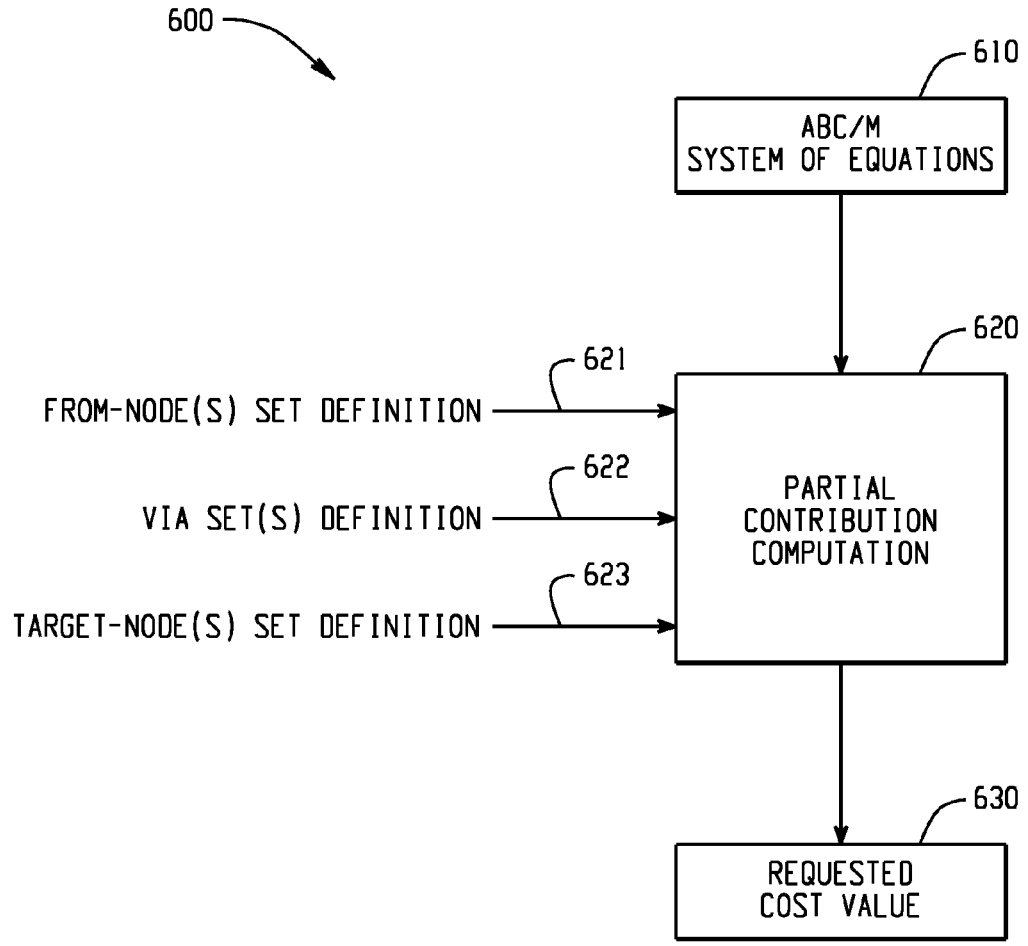
FIG. 8 is a block diagram depicting example inputs and outputs of a partial contribution computation.

FIG. 8 is a block diagram 600 depicting the inputs and outputs of a partial contribution computation containing via-set definitions. The partial contribution computation 620 receives as input the details of the ABC/M graph that is to be analyzed, such as through a representative series of equations 610. The computation uses set definitions of source-nodes 621, via-nodes 622, and target-nodes 623. After these items are received, the partial contribution computation 620 processes the data to provide the requested cost value 630 from the identified source-node set 621 to the desired target-node set 623 through the defined via-node set 622.

Figure 9:
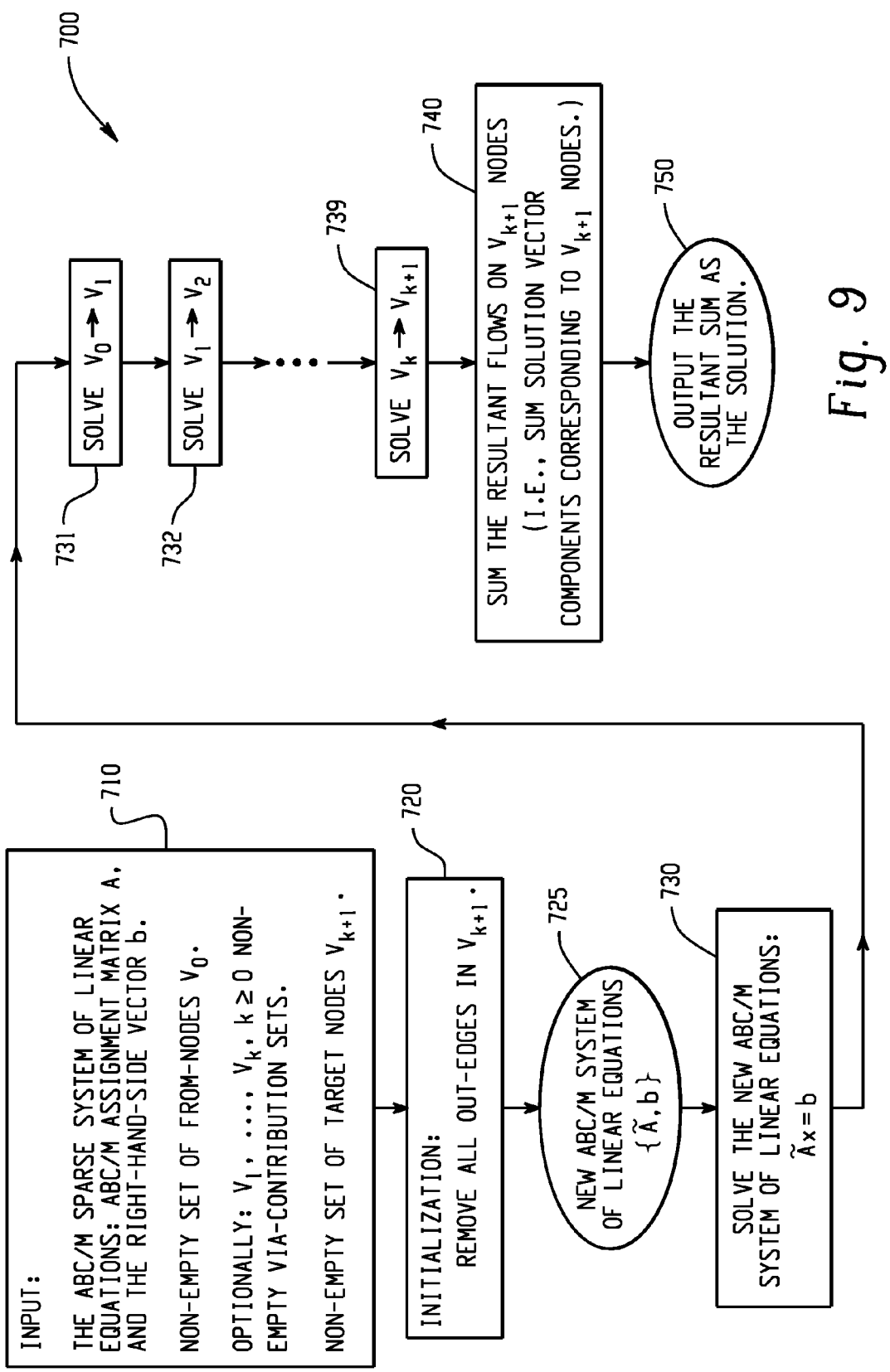
FIG. 9 is a top-level flow diagram depicting an example of solving a partial contribution computation utilizing via-nodes.

As a more detailed processing example, FIG. 9 depicts an operational scenario for solving a partial contribution computation utilizing via-nodes. The general case partial contribution problem where via-nodes are given begins with the inputting of parameters in step 710. The ABC/M system of linear equations is received as input and comprises the ABC/M assignment matrix A, and the right-hand-side vector b. Additionally, a non-empty set of source-nodes $V_0$ and a non-empty set of target nodes $V_{k+1}$ are identified. A set of via-nodes, $V_1, V_2, \ldots, V_k$, may also be identified. Step 720 removes all out-edges of members of the target-node set. This removal of target-node out-edges results in a new ABC/M system of linear equations {Ã,b}. This new system of linear equations {Ã,b} is then solved in step 730.

After the new set of linear equations 725 is solved in step 730, the via-set contribution problem is solved in an iterative fashion through the processing depicted in steps 731 through 739 in FIG. 9. To solve each step, $V_0 \rightarrow V_1, V_1 \rightarrow V_2, \ldots, V_k \rightarrow V_{k+1}$, only money from the nodes in the $V_{p-1}$ via-set to nodes in the $V_p$ via-set are retained for each via-set identified. Flows from all other nodes which are not in the $V_{p-1}$ via-set are ignored, thereby preventing flows from nodes not identified as part of the via-sets from interfering with the proper calculations. The iterative process is repeated k+1 times as p is incremented from 1 to k+1, where k equals the number of via-sets specified.

Once the iterative process of steps 731 through 739 is completed, the resultant flows on the $V_{k+1}$ set (the target-nodes) are summed in step 740. The total of these flows represents the answer to the desired question of what is the total source-node contribution to the target-node set through the specified via-nodes. This resultant sum is outputted as the solution in step 750.

Figure 10:
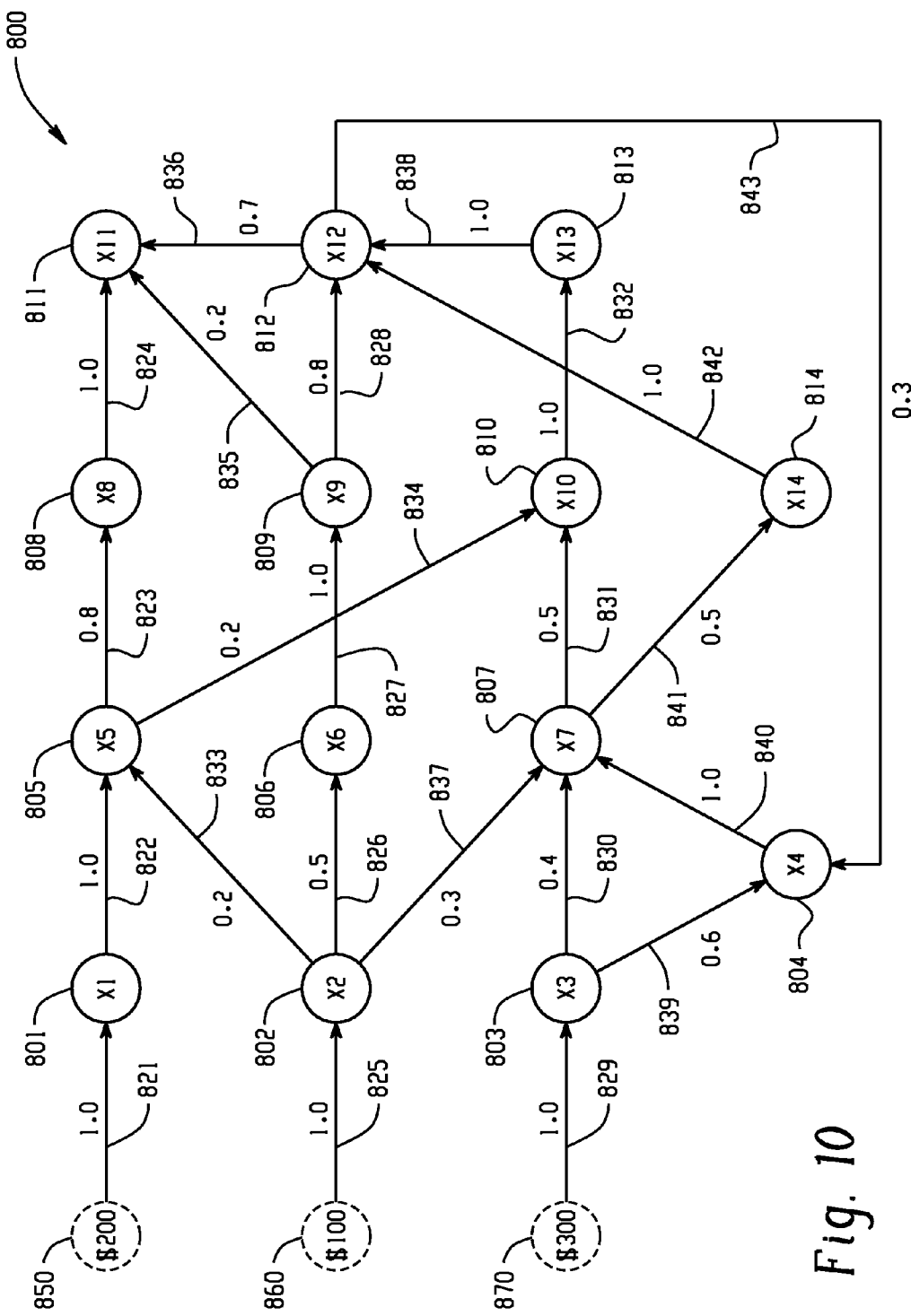
FIG. 10 depicts an example model diagram.

FIG. 10 provides a graph 800 to illustrate an operational scenario for the general case having defined via-nodes. The ABC/M model graph 800 contains 14 nodes 801 through 814 as well as 23 edges 821 through 843. In this example, there are three sources of money. Node X1 801 is supplied $200 through edge 821, node X2 802 is supplied $100 through edge 825, and node X3 803 is supplied $300 through edge 829. For this example, we seek to determine the contribution of nodes X1 801 and X2 802 to nodes X11 811, X12 812, and X13 813 through two via-node sets, {X5 805, X7 807} and {X8 808, X10 810, X14 814}. Thus, our problem definition can be summarized as follows:

F={X1,X2} The set of source-nodes
V1{X5,X7} The first via-set
V2={X8, X10, X14} The second via-set
T={X11, X12, X13} The set of target-nodes
The ABC/M graph of FIG. 10 can be numerically represented by the following matrix:

$$\begin{bmatrix} 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 \\ 0 & 0 & -0.6 & 1 & 0 & 0 & 0 & 0 & 0 & 0 & 0 & 0 & 0 & 0 \\ -1 & -0.2 & 0 & 0 & 1 & 0 & 0 & 0 & 0 & 0 & 0 & -0.3 & 0 & 0 \\ 0 & -0.5 & 0 & 0 & 0 & 1 & 0 & 0 & 0 & 0 & 0 & 0 & 0 & 0 \\ 0 & -0.3 & 0.4 & -1 & 0 & 0 & 1 & 0 & 0 & 0 & 0 & 0 & 0 & 0 \\ 0 & 0 & 0 & 0 & -0.8 & 0 & 0 & 1 & 0 & 0 & 0 & 0 & 0 & 0 \\ 0 & 0 & 0 & 0 & 0 & -1 & 0 & 0 & 1 & 0 & 0 & 0 & 0 & 0 \\ 0 & 0 & 0 & 0 & -0.2 & 0 & -0.5 & 0 & 0 & 1 & 0 & 0 & 0 & 0 \\ 0 & 0 & 0 & 0 & 0 & 0 & 0 & -1 & -0.2 & 0 & 1 & -0.7 & 0 & 0 \\ 0 & 0 & 0 & 0 & 0 & 0 & 0 & 0 & -0.8 & 0 & 0 & 1 & -1 & -1 \\ 0 & 0 & 0 & 0 & 0 & 0 & 0 & 0 & 0 & -1 & 0 & 0 & 1 & 0 \\ 0 & 0 & 0 & 0 & 0 & 0 & -0.5 & 0 & 0 & 0 & 0 & 0 & 0 & 1 \end{bmatrix} \begin{bmatrix} X1 \\ X2 \\ X3 \\ X4 \\ X5 \\ X6 \\ X7 \\ X8 \\ X9 \\ X10 \\ X11 \\ X12 \\ X13 \\ X14 \end{bmatrix} = \begin{bmatrix} 200 \\ 100 \\ 300 \\ 0 \\ 0 \\ 0 \\ 0 \\ 0 \\ 0 \\ 0 \\ 0 \\ 0 \\ 0 \\ 0 \end{bmatrix}$$

The details of the ABC/M graph, the source-node set, the via-node sets, and the target-node sets are all known. Thus, the input step 710 of FIG. 9 is now complete.

Figure 11:
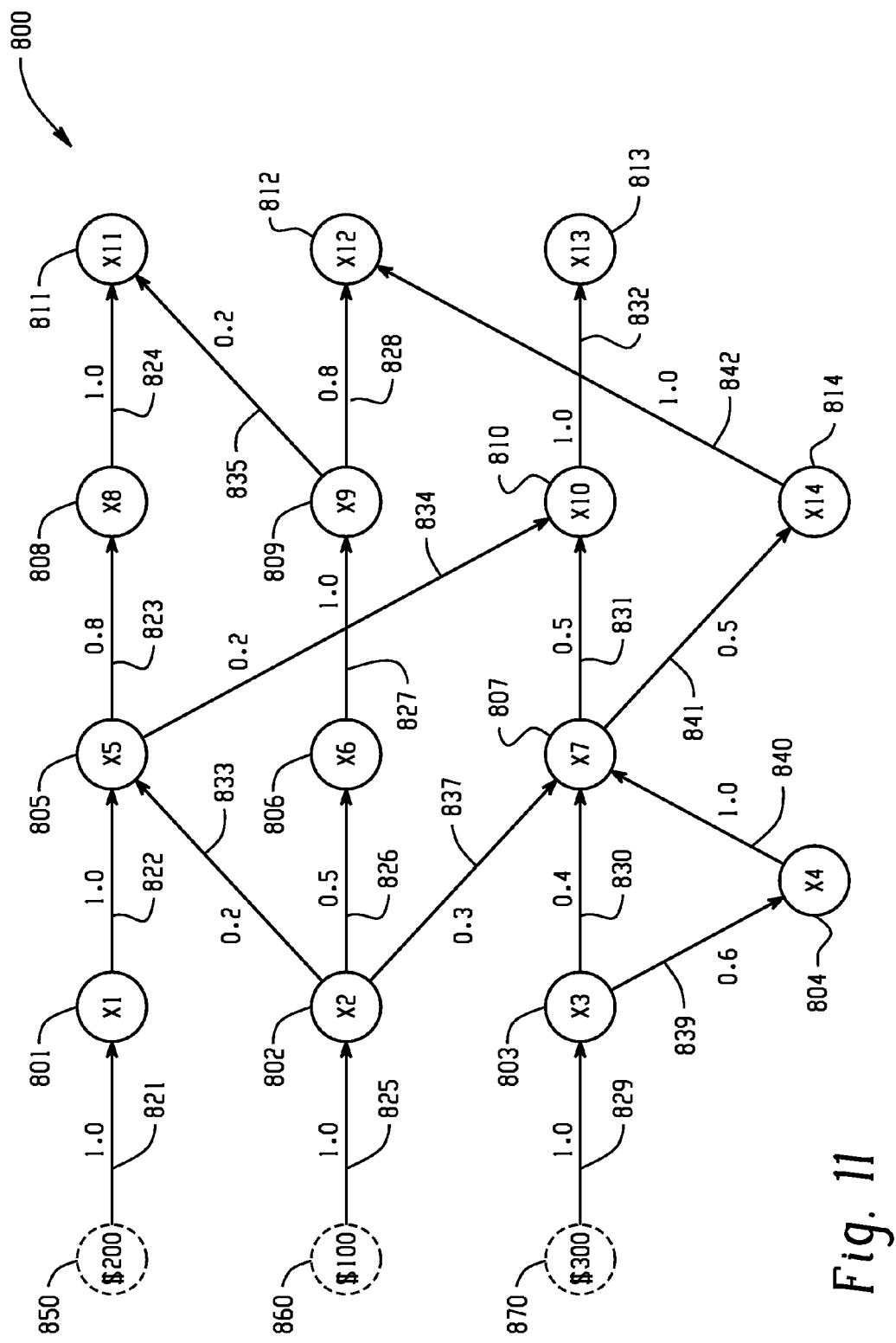
FIGS. 11-14 depict the example model diagram being processed through edge removal and via-node set processing.

The process continues with step 720 of FIG. 9 which requires that all out-edges be removed from all target-node set members. This is illustrated in FIG. 11 where it can be seen that edges 836, 838, and 843 have been removed from the ABC/M graph 800. The corresponding values in the matrix representation of ABC/M graph 800 are removed resulting in a new ABC/M system of linear equations {Ã,b} as noted in step 725 of FIG. 9. The new ABC/M system of linear equations for the current example can be represented as follows:

$$\begin{bmatrix} 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 \\ 0 & 0 & -0.6 & 1 & 0 & 0 & 0 & 0 & 0 & 0 & 0 & 0 & 0 & 0 \\ -1 & -0.2 & 0 & 0 & 1 & 0 & 0 & 0 & 0 & 0 & 0 & 0 & 0 & 0 \\ 0 & -0.5 & 0 & 0 & 0 & 1 & 0 & 0 & 0 & 0 & 0 & 0 & 0 & 0 \\ 0 & -0.3 & -0.4 & 1 & 0 & 0 & 1 & 0 & 0 & 0 & 0 & 0 & 0 & 0 \\ 0 & 0 & 0 & 0 & -0.8 & 0 & 0 & 1 & 0 & 0 & 0 & 0 & 0 & 0 \\ 0 & 0 & 0 & 0 & 0 & -1 & 0 & 0 & 1 & 0 & 0 & 0 & 0 & 0 \\ 0 & 0 & 0 & 0 & -0.2 & 0 & -0.5 & 0 & 0 & 1 & 0 & 0 & 0 & 0 \\ 0 & 0 & 0 & 0 & 0 & 0 & 0 & -1 & -0.2 & 0 & 1 & 0 & 0 & 0 \\ 0 & 0 & 0 & 0 & 0 & 0 & 0 & 0 & -0.8 & 0 & 0 & 1 & 0 & -1 \\ 0 & 0 & 0 & 0 & 0 & 0 & 0 & 0 & 0 & -1 & 0 & 0 & 1 & 0 \\ 0 & 0 & 0 & 0 & 0 & 0 & -0.5 & 0 & 0 & 0 & 0 & 0 & 0 & 1 \end{bmatrix} \begin{bmatrix} X1 \\ X2 \\ X3 \\ X4 \\ X5 \\ X6 \\ X7 \\ X8 \\ X9 \\ X10 \\ X11 \\ X12 \\ X13 \\ X14 \end{bmatrix} = \begin{bmatrix} 200 \\ 100 \\ 0 \\ 0 \\ 0 \\ 0 \\ 0 \\ 0 \\ 0 \\ 0 \\ 0 \\ 0 \\ 0 \\ 0 \end{bmatrix}$$

Note that the values at row 4 column 12, row 11 column 12, and row 12 column 13 have been made equal to zero to correspond to the removal of edges 836, 838, and 843, respectively. Also note that this problem is only concerned with money flowing from source-nodes X1 801 and X2 802. Therefore, the $300 initial source 870 which flows through X3 803 is not relevant to the calculation. Corresponding with this fact, the entry in row 3 of the b matrix is changed to zero as well.

Solving this system of equations as directed in step 730 of FIG. 9 results in the following solution vector:

X1=200, X2=100, X3=0, X4=0, X5=220, X6=50,
X7=30, X8=176, X9=50, X10=59, X1=186,
X12=55, X13=59, X14=15

Figure 12:
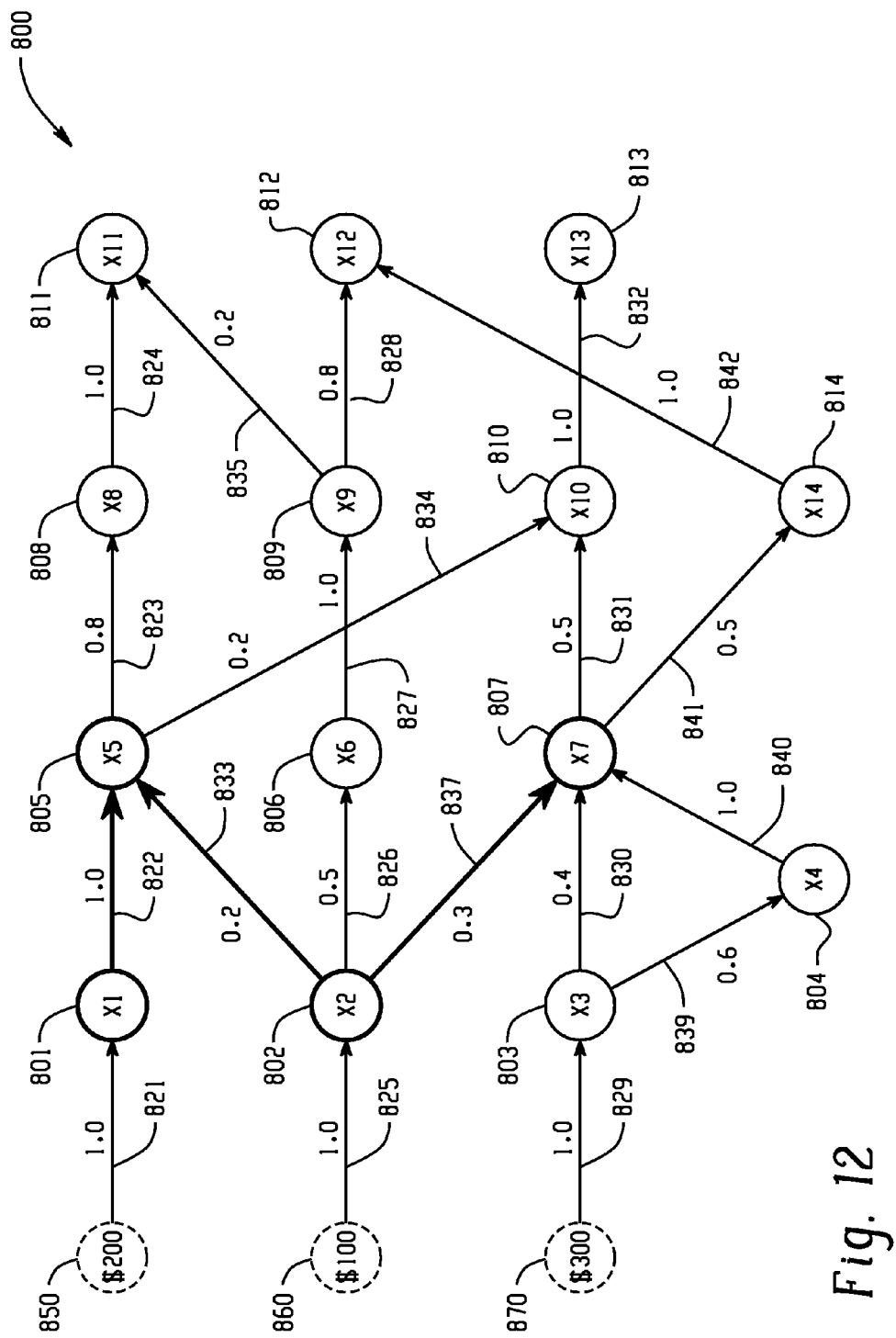

Solving the equation in step 730 calculates the contributions from the source node set {X1, X2} to all other nodes. Specifically, the first iterative step 731 of FIG. 9 seeks the contribution from the source node set V0 {X1, X2} to the first via-node set V1{X5, X7} as depicted in FIG. 12. These values are obtained from the above solution vector's elements corresponding to the first via-node set {X5, X7} (220 and 30) while ignoring the amounts contributed to other nodes. These iterations will continue k+1 times. In this problem, because two via-node sets are identified, k+1 equals three.

The process moves to the second iterative solving of step of FIG. 9. The second iteration seeks the contribution from the first via-node set {X5, X7} to the second via-node set {X8, X10, X14} (V₁→V₂). Because the problem is only concerned with the contributions from the first via-node set to the second via-node set, the process will only push forward the values corresponding to the first via-node set members {X5, X7} from the previous iteration. Thus, the matrix representation for this step is as follows:

$$\begin{bmatrix} 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 \\ 0 & 0 & -0.6 & 1 & 0 & 0 & 0 & 0 & 0 & 0 & 0 & 0 & 0 & 0 \\ -1 & -0.2 & 0 & 0 & 1 & 0 & 0 & 0 & 0 & 0 & 0 & 0 & 0 & 0 \\ 0 & -0.5 & 0 & 0 & 0 & 1 & 0 & 0 & 0 & 0 & 0 & 0 & 0 & 0 \\ 0 & -0.3 & -0.4 & -1 & 0 & 0 & 1 & 0 & 0 & 0 & 0 & 0 & 0 & 0 \\ 0 & 0 & 0 & 0 & -0.8 & 0 & 0 & 1 & 0 & 0 & 0 & 0 & 0 & 0 \\ 0 & 0 & 0 & 0 & 0 & -1 & 0 & 0 & 1 & 0 & 0 & 0 & 0 & 0 \\ 0 & 0 & 0 & 0 & -0.2 & 0 & -0.5 & 0 & 0 & 1 & 0 & 0 & 0 & 0 \\ 0 & 0 & 0 & 0 & 0 & 0 & 0 & -1 & -0.2 & 0 & 1 & 0 & 0 & 0 \\ 0 & 0 & 0 & 0 & 0 & 0 & 0 & 0 & -0.8 & 0 & 0 & 1 & 0 & -1 \\ 0 & 0 & 0 & 0 & 0 & 0 & 0 & 0 & 0 & -1 & 0 & 0 & 1 & 0 \\ 0 & 0 & 0 & 0 & 0 & 0 & -0.5 & 0 & 0 & 0 & 0 & 0 & 0 & 1 \end{bmatrix} \begin{bmatrix} X1 \\ X2 \\ X3 \\ X4 \\ X5 \\ X6 \\ X7 \\ X8 \\ X9 \\ X10 \\ X11 \\ X12 \\ X13 \\ X14 \end{bmatrix} = \begin{bmatrix} 0 \\ 0 \\ 0 \\ 0 \\ 200 \\ 0 \\ 30 \\ 0 \\ 0 \\ 0 \\ 0 \\ 0 \\ 0 \\ 0 \end{bmatrix}$$

Solving this set of equations produces the following result vector:

X1=0, X2=0, X3=0, X4=0, X5=220, X6=0, X7=30,
X8=176, X9=0, X10=59, X11=176, X12=15,
X13=59, X14=15

Figure 13:
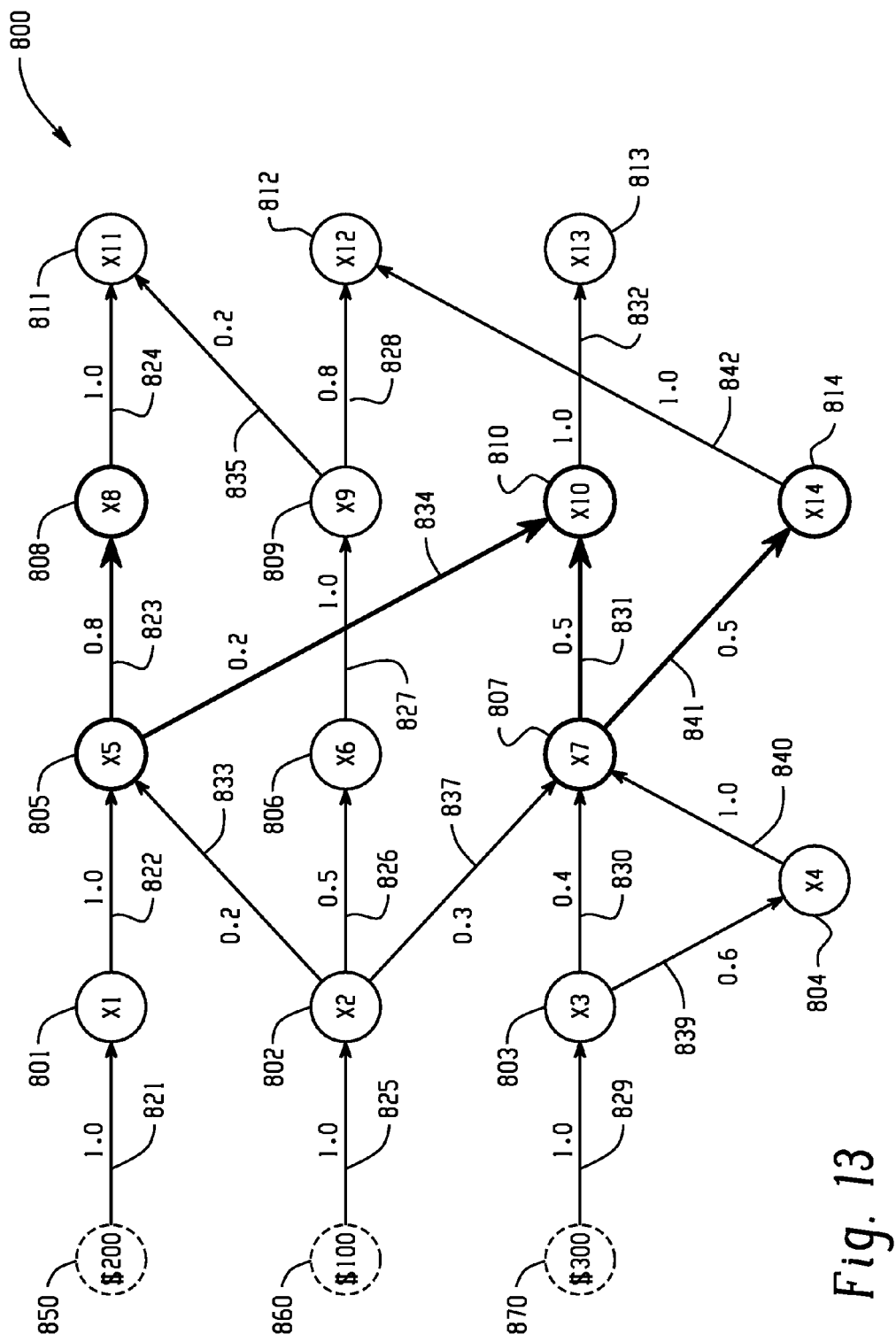

To complete iterative step 732, the process determines the contributions from the first via-node set {X5, X7} to the second via-node set {X8, X10, X14} (176, 59, and 15) as depicted in FIG. 13 while ignoring the contributions to other nodes.

Figure 14:
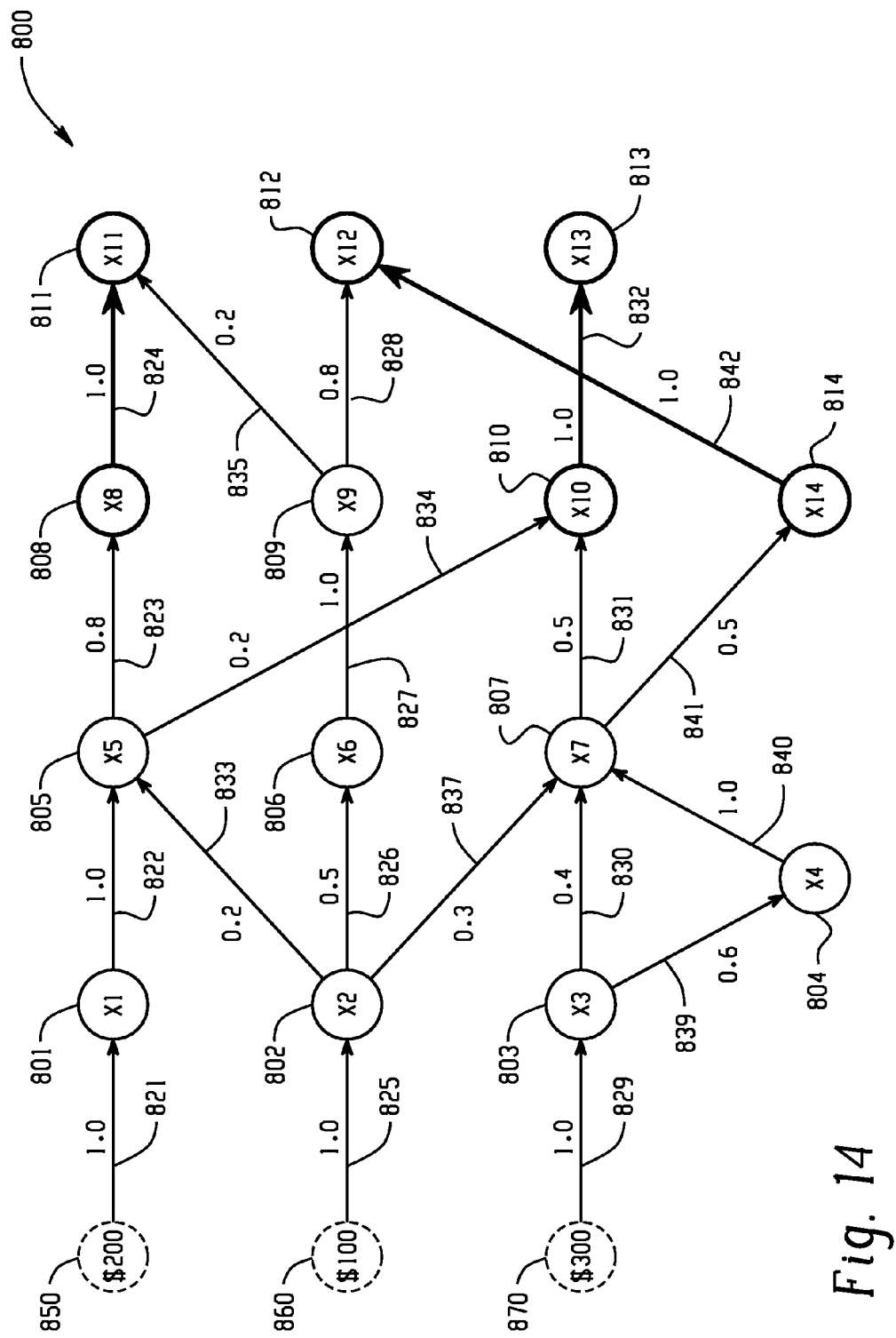

If more via-node sets were identified, the iterative process would continue as depicted in FIG. 9. However, in this example with two via-sets specified, the process has now reached the final iteration of $V_k \rightarrow V_{k+1}$. ($V_k \rightarrow V_{k+1}$ is synonymous to $V_2 \rightarrow V_3$ and $V_2 \rightarrow T$ in this problem.) This final iteration from the second via-node set {X8, X10, X14} to target-node set {X11, X12, X13} is depicted in FIG. 14. Once again the A portion of the matrix remains the same with the b section depicting only the contributions from the first via-node set members {X5, X7} to the second via-node set members {X8, X10, X14}. The representative equations are as follows:

Solving these equations generates the following solution vector:

X1=0, X2=0, X3=0, X4=0, X5=0, X6=0, X7=0,
X8=176, X9=0, X10=59, X11=176, X12=15,
X13=59, X14=15

Step 740 then requires the summing of the resultant flows on the target nodes {X11, X12, and X13} (176, 15, 59). Summing these three values results in a total contribution from the source-node set to the target-node set through the two via-node sets of 250. This sum is outputted as the solution in step 750.

Figure 15:
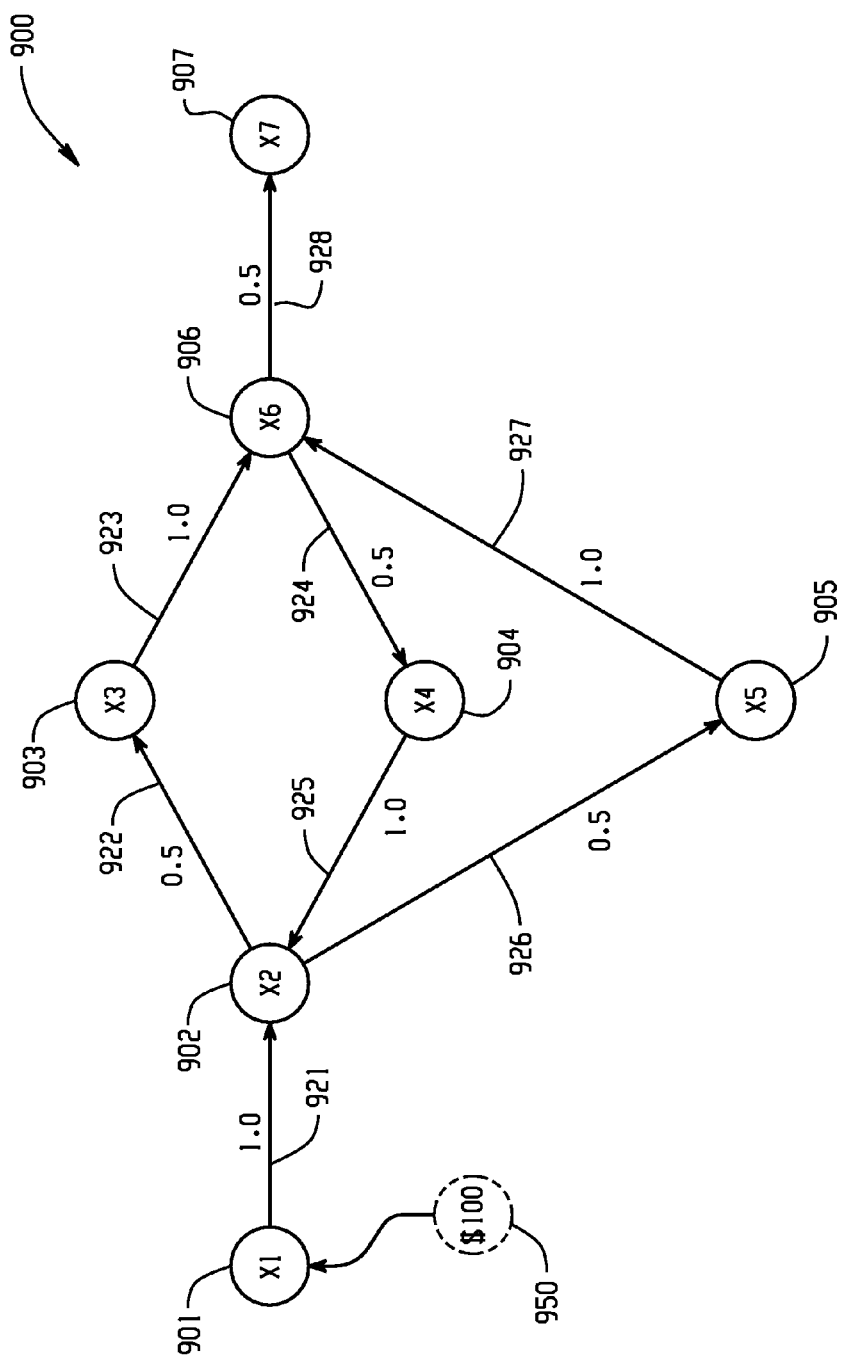
FIG. 15 depicts an example model diagram.

FIG. 15 depicts another example ABC/M graph 900 which contains cycles. This example seeks to calculate the contribution from source-nodes {X3 903, X4 904} to target-node {X6 906}. The ABC/M graph 900 can be represented in matrix form as follows:

$$\begin{bmatrix} 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 \\ 0 & 0 & -0.6 & 1 & 0 & 0 & 0 & 0 & 0 & 0 & 0 & 0 & 0 & 0 \\ -1 & -0.2 & 0 & 0 & 1 & 0 & 0 & 0 & 0 & 0 & 0 & 0 & 0 & 0 \\ 0 & -0.5 & 0 & 0 & 0 & 1 & 0 & 0 & 0 & 0 & 0 & 0 & 0 & 0 \\ 0 & -0.3 & -0.4 & -1 & 0 & 0 & 1 & 0 & 0 & 0 & 0 & 0 & 0 & 0 \\ 0 & 0 & 0 & 0 & -0.8 & 0 & 0 & 1 & 0 & 0 & 0 & 0 & 0 & 0 \\ 0 & 0 & 0 & 0 & 0 & -1 & 0 & 0 & 1 & 0 & 0 & 0 & 0 & 0 \\ 0 & 0 & 0 & 0 & -0.2 & 0 & -0.5 & 0 & 0 & 1 & 0 & 0 & 0 & 0 \\ 0 & 0 & 0 & 0 & 0 & 0 & 0 & -1 & -0.2 & 0 & 1 & 0 & 0 & 0 \\ 0 & 0 & 0 & 0 & 0 & 0 & 0 & 0 & -0.8 & 0 & 0 & 1 & 0 & -1 \\ 0 & 0 & 0 & 0 & 0 & 0 & 0 & 0 & 0 & -1 & 0 & 0 & 1 & 0 \\ 0 & 0 & 0 & 0 & 0 & 0 & -0.5 & 0 & 0 & 0 & 0 & 0 & 0 & 1 \end{bmatrix} \begin{bmatrix} X1 \\ X2 \\ X3 \\ X4 \\ X5 \\ X6 \\ X7 \\ X8 \\ X9 \\ X10 \\ X11 \\ X12 \\ X13 \\ X14 \end{bmatrix} = \begin{bmatrix} 0 \\ 0 \\ 0 \\ 0 \\ 0 \\ 0 \\ 0 \\ 176 \\ 0 \\ 59 \\ 0 \\ 0 \\ 0 \\ 15 \end{bmatrix}$$

$$\begin{bmatrix} 1 & 0 & 0 & 0 & 0 & 0 & 0 \\ -1 & 1 & 0 & -1 & 0 & 0 & 0 \\ 0 & -0.5 & 1 & 0 & 0 & 0 & 0 \\ 0 & 0 & 0 & 1 & 0 & -0.5 & 0 \\ 0 & -0.5 & 0 & 0 & 1 & 0 & 0 \\ 0 & 0 & -1 & -1 & 1 & 0 \\ 0 & 0 & 0 & 0 & 0 & -0.5 & 1 \end{bmatrix} \begin{bmatrix} X1 \\ X2 \\ X3 \\ X4 \\ X5 \\ X6 \\ X7 \end{bmatrix} = \begin{bmatrix} 100 \\ 0 \\ 0 \\ 0 \\ 0 \\ 0 \\ 0 \end{bmatrix}$$

Figure 16:
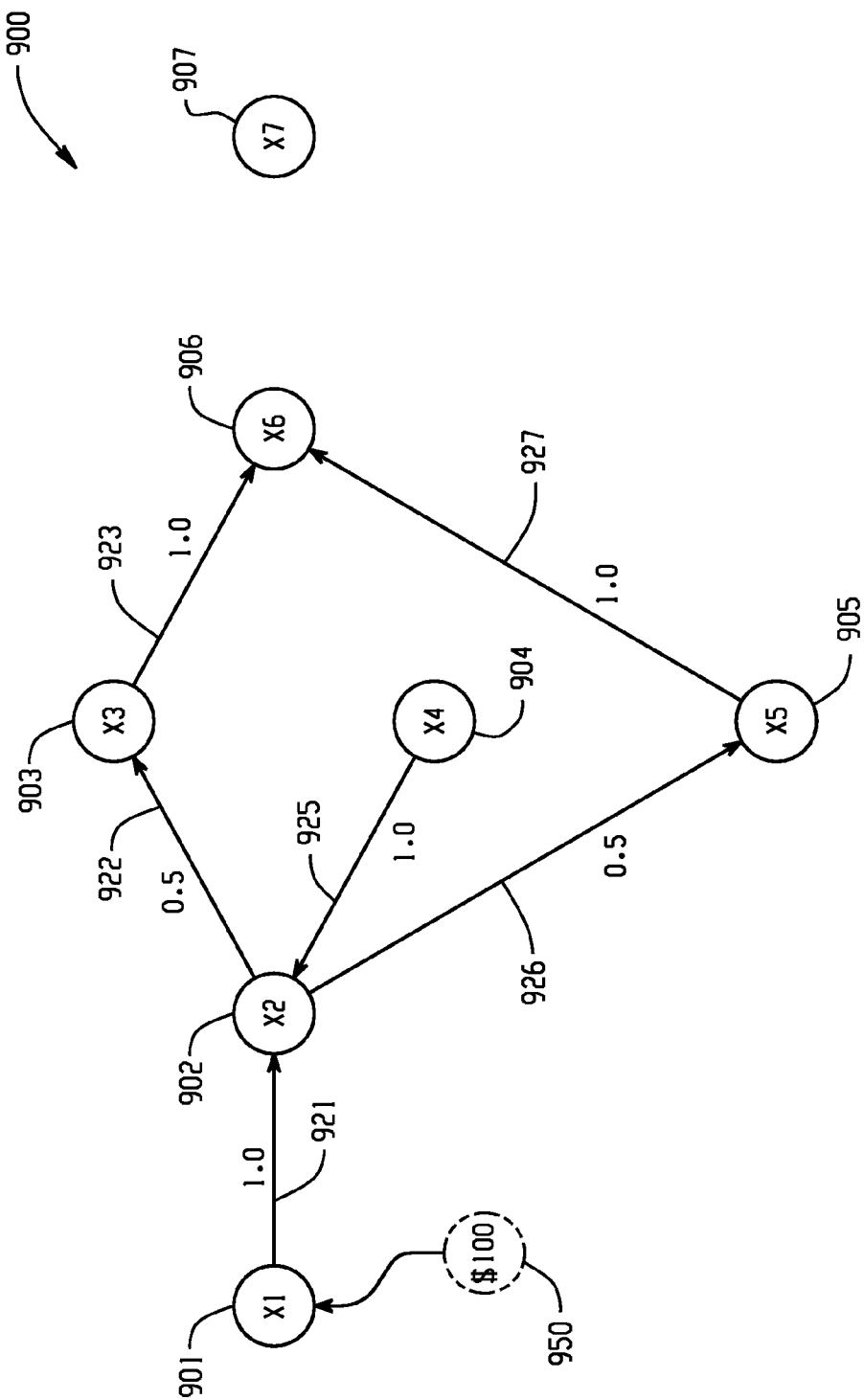
FIG. 16 depicts the example model diagram following edge removal.

No via-sets are provided. Therefore, the procedure follows the contribution problem, F→T. The procedure removes all out-edges from target-nodes {X6} to avoid double-counting and self-contribution issues as shown in FIG. 16 with the removal of edges 924 and 928. The corresponding matrix representation {Ã,b} is as follows:

$$\begin{bmatrix} 1 & 0 & 0 & 0 & 0 & 0 & 0 \\ -1 & 1 & 0 & -1 & 0 & 0 & 0 \\ 0 & -0.5 & 1 & 0 & 0 & 0 & 0 \\ 0 & 0 & 0 & 1 & 0 & 0 & 0 \\ 0 & -0.5 & 0 & 0 & 1 & 0 & 0 \\ 0 & 0 & -1 & 0 & -1 & 1 & 0 \\ 0 & 0 & 0 & 0 & 0 & 0 & 1 \end{bmatrix} \begin{bmatrix} X1 \\ X2 \\ X3 \\ X4 \\ X5 \\ X6 \\ X7 \end{bmatrix} = \begin{bmatrix} 100 \\ 0 \\ 0 \\ 0 \\ 0 \\ 0 \\ 0 \end{bmatrix}$$

Observe that the sixth column's off-diagonal coefficients are now zero corresponding to the removal of node X6's out-edges. The above set of linear equations is then solved to produce the following resultant vector:

X1=100, X2=100 X3=50, X4=0, X5=50, X6=100, X7=100

Figure 17:
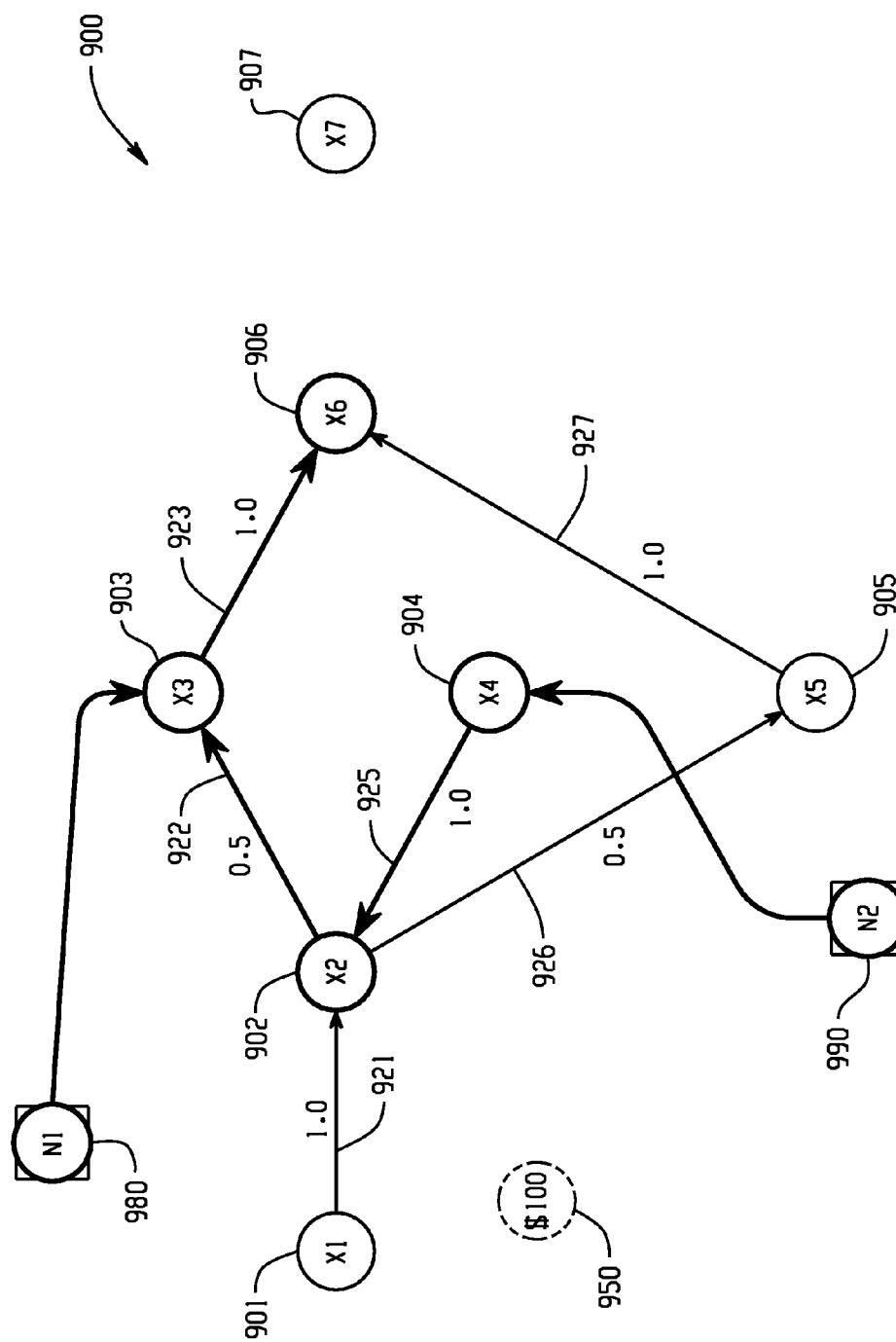
FIG. 17 depicts the example model diagram utilizing virtual nodes to solve the partial contribution computation.

The resulting flow for node X6 (100) would be the correct answer if the problem had sought to determine the contribution from X1 to X6. However, the problem in this example seeks the contribution from intermediate nodes X3 and X4 to target-node X6. This requires the creation of virtual nodes, N1 980 and N2 990 as depicted in FIG. 17 and the disconnection of the input to the system 950. With input 950 disconnected, a new right hand side vector is computed to represent the virtual node inputs:

$$b' = -A_3 X3 - A_4 X4 = -\begin{bmatrix} 0 \\ 0 \\ 1 \\ 0 \\ 0 \\ -1 \\ 0 \end{bmatrix}(50) - \begin{bmatrix} 0 \\ -1 \\ 0 \\ 1 \\ 0 \\ 0 \\ 0 \end{bmatrix}(0) = \begin{bmatrix} 0 \\ 0 \\ -50 \\ 0 \\ 0 \\ 50 \\ 0 \end{bmatrix}$$

(where $A_k$ denotes the $k$-th matrix column)

To represent the creation of virtual nodes N1 980 and N2 990 in the matrix representation, the procedure removes all out-edges from nodes X3 903 and X4 904. This results in the following matrix representation:

$$A' = \begin{bmatrix} 1 & 0 & 0 & 0 & 0 & 0 & 0 \\ -1 & 1 & 0 & 0 & 0 & 0 & 0 \\ 0 & -0.5 & -1 & 0 & 0 & 0 & 0 \\ 0 & 0 & 0 & -1 & 0 & 0 & 0 \\ 0 & -0.5 & 0 & 0 & 1 & 0 & 0 \\ 0 & 0 & 0 & 0 & -1 & 1 & 0 \\ 0 & 0 & 0 & 0 & 0 & 0 & 1 \end{bmatrix}$$

The contribution problem, A'x=b, is then solved producing the following solution vector:

X1=0, X2=0, X3=50, X4=0, X5=0, X6=50, X7=0

Summing the target-node's {X6's} solution value (50), the procedure arrives at the desired contribution value from source-nodes {X3, X4} to the target-node {X6} of $50.

Figure 18:
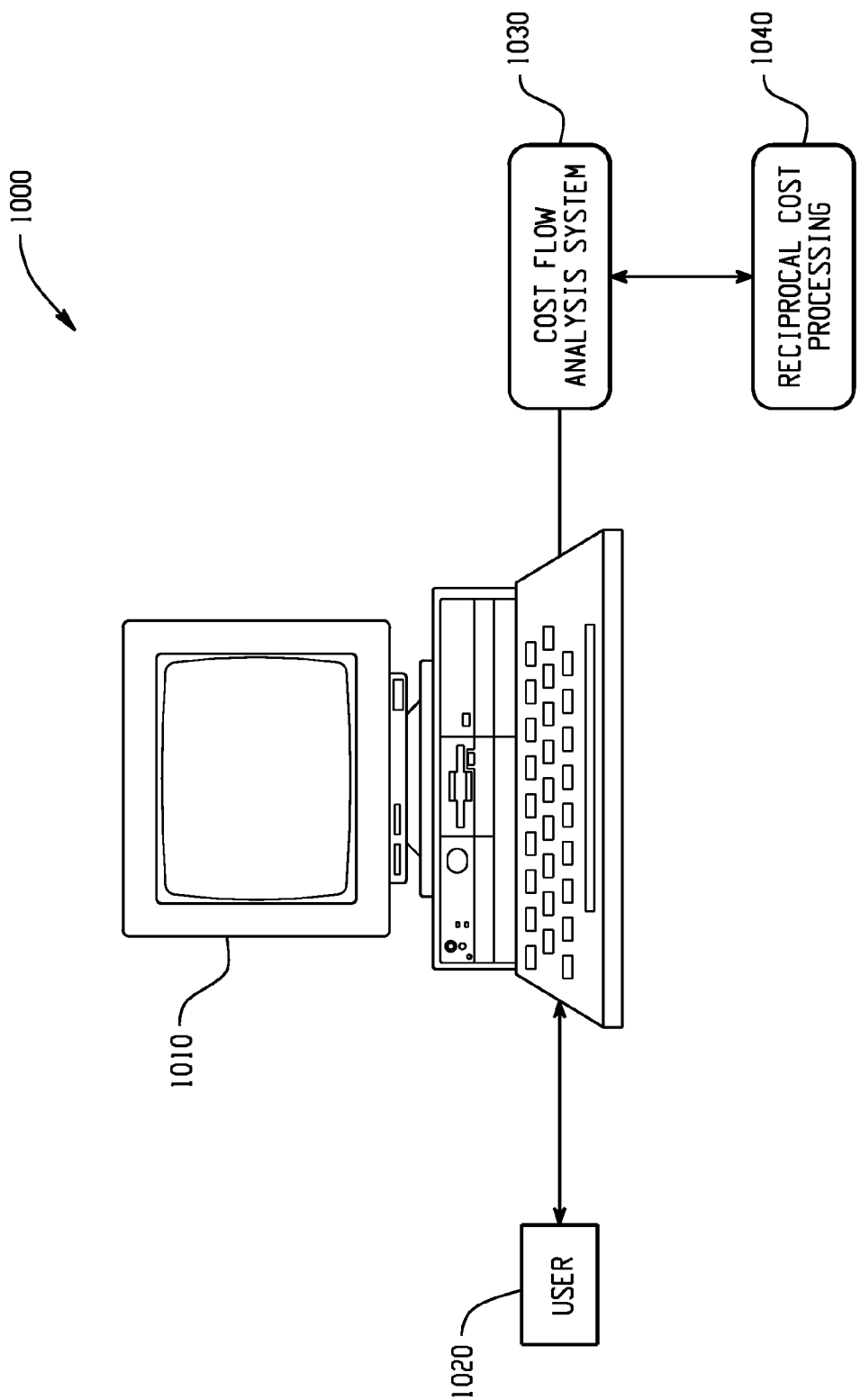
FIG. 18 is a block diagram depicting an environment wherein a user can interact with a cost flow analysis system.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting. As an illustration, the systems and methods may be implemented on various types of computer architectures, such as for example on a single general purpose computer or workstation (as shown at 1010 on FIG. 18), or on a networked system, or in a client-server configuration, or in an application service provider configuration.

As another example of the wide scope of the systems and methods disclosed herein, a cost flow analysis system can be used with many different types of graphs. As an illustration, the entities of a graph can include resources, activities and cost objects (e.g., cost pools such as organizational cost pools, activity-based cost pools, process-based cost pools, other logical groupings of money, and combinations thereof).

The nodes of the graph can represent accounts associated with the resources, activities, or cost objects. In such a graph, an edge of the graph is associated with a percentage, which defines how much money flows from a source account to a destination account. The cost flow model depicts how money flows in the enterprise, starting from the resources to the activities, and finally, to the cost objects. The cost objects can represent products or services provided by the enterprise.

Such a graph can be relatively complex as it may include over 100,000 accounts and over 1,000,000 edges. This can arise when modeling the cost flow among service department accounts in one or more large companies. Examples of service departments include human resources department, an information technology department, a maintenance department, or an administrative department. In such a situation, a cost flow analysis system determines allocation of costs for the entities in the cost flow model, thereby allowing a user to establish a cost associated with operating each of the entities in the cost flow model. The allocation of costs may include budgeting, allocating expenses, allocating revenues, allocating profits, assigning capital, and combinations thereof.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer-implemented method of determining a flow, comprising:
    receiving, using one or more data processors, flow data identifying inflow and outflow relationships among a plurality of entities, wherein each inflow and outflow relationship has an associated flow proportion, and wherein each inflow and outflow relationship represents how money flows in an enterprise;
    receiving, using the one or more data processors, source-entity data identifying one or more source entities that contribute, wherein the source-entity data includes an associated contribution amount, and wherein each source-entity has one or more outflow relationships associated with one or more other entities;
    receiving, using the one or more data processors, target-entity data identifying one or more target entities, wherein each target-entity has one or more inflow relationships and one or more outflow relationships associated with one or more other entities;
    generating, using the one or more data processors, a model corresponding to a system of linear equations, wherein the model is generated using the flow data, the source-entity data, the target-entity data, the flow proportions, and the contribution amounts;
    generating, using the one or more data processors, a revised model corresponding to a modified system of linear equations, wherein the revised model is generated by removing flow proportions associated with all outflow relationships of the one or more target-entities; and
    determining, using the one or more data processors, a flow among the plurality of entities by solving the modified system of linear equations corresponding to the revised model.

2. The method of claim 1, wherein at least one of the source entities has a reciprocal relationship with another of the entities.

3. The method of claim 1, wherein the modified system of linear equations is identical to the system of linear equations except that all non-diagonal elements corresponding to target entities are set equal to zero.

4. The method of claim 1, wherein the system of linear equations is a sparse system of linear equations.

5. The method of claim 1, wherein the inflow and outflow relationships are provided by an activity based costing and management model.

6. The method of claim 1, wherein the entities are resources, activities, and cost objects.

7. The method of claim 6,
    wherein the inflow and outflow relationships are provided by a multi-dimensional directed graph that depicts how money flows in an enterprise; and
    wherein nodes of the graph represent accounts associated with the resources, activities, or cost objects.

8. The method of claim 1 further comprising:
    receiving via-entity set definition information identifying one or more intermediate entities through which the source entities provide money to other entities; and
    solving a contribution problem for each intermediate entity.

9. The method of claim 8, wherein solving the contribution problem for each via-entity uses virtual nodes.

10. The method of claim 1, wherein the inflow and outflow relationships are provided by a cyclic model.

11. The method of claim 1, wherein the inflow and outflow relationships are provided by an acyclic model.

12. A system for determining a flow, comprising:
    one or more processors;
    one or more computer-readable storage mediums containing instructions configured to cause the one or more processors to perform operations including:
    receiving flow data identifying inflow and outflow relationships among a plurality of entities, wherein each inflow and outflow relationship has an associated flow proportion, and wherein each inflow and outflow relationship represents how money flows in an enterprise;
    receiving source-entity data identifying one or more source entities that contribute, wherein the source-entity data includes an associated contribution amount, and wherein each source-entity has one or more outflow relationships associated with one or more other entities;
    receiving target-entity data identifying one or more target entities, wherein each target-entity has one or more inflow relationships and one or more outflow relationships associated with one or more other entities;

generating a model corresponding to a system of linear equations, wherein the model is generated using the flow data, the source-entity data, the target-entity data, the flow proportions, and the contribution amounts;

generating a revised model corresponding to a modified system of linear equations, wherein the revised model is generated by removing flow proportions associated with all outflow relationships of the one or more target-entities; and determining a flow among the plurality of entities by solving the modified system of linear equations corresponding to the revised model.

13. A computer program product for determining a flow, tangibly embodied in a machine-readable non-transitory storage medium, including instructions configured to cause a data processing system to:

receive flow data identifying inflow and outflow relationships among a plurality of entities, wherein each inflow and outflow relationship has an associated flow proportion, and wherein each inflow and outflow relationship represents how money flows in an enterprise;

receive source-entity data identifying one or more source entities that contribute, wherein the source-entity data includes an associated contribution amount, and wherein each source-entity has one or more outflow relationships associated with one or more other entities;

receive target-entity data identifying one or more target entities, wherein each target-entity has one or more inflow relationships and one or more outflow relationships associated with one or more other entities;

generate a model corresponding to a system of linear equations, wherein the model is generated using the flow data, the source-entity data, the target-entity data, the flow proportions, and the contribution amounts;

generate a revised model corresponding to a modified system of linear equations, wherein the revised model is generated by removing flow proportions associated with all outflow relationships of the one or more target-entities; and determine a flow among the plurality of entities by solving the modified system of linear equations corresponding to the revised model.

* * * * *